United States Patent
Ouchi

(10) Patent No.: US 8,356,139 B2
(45) Date of Patent: Jan. 15, 2013

(54) STORAGE SYSTEM FOR MAINTAINING HARD DISK RELIABILITY

(75) Inventor: Katsumi Ouchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 12/527,448

(22) PCT Filed: Mar. 24, 2009

(86) PCT No.: PCT/JP2009/056759
§ 371 (c)(1),
(2), (4) Date: Aug. 17, 2009

(87) PCT Pub. No.: WO2010/109675
PCT Pub. Date: Sep. 30, 2010

(65) Prior Publication Data
US 2011/0264854 A1    Oct. 27, 2011

(51) Int. Cl.
*G06F 12/00* (2006.01)

(52) U.S. Cl. . 711/112; 711/114; 711/156; 711/E12.001; 713/324; G9B/5.181; G9B/19.033; G9B/19.034; G9B/19.046

(58) Field of Classification Search .......... None
See application file for complete search history.

(56) References Cited

U.S. PATENT DOCUMENTS

| | | | | |
|---|---|---|---|---|
| 5,774,292 A | * | 6/1998 | Georgiou et al. | 360/73.03 |
| 5,819,100 A | * | 10/1998 | Pearce | 713/323 |
| 7,035,972 B2 | * | 4/2006 | Guha et al. | 711/114 |
| 7,106,540 B1 | * | 9/2006 | Hobbet et al. | 360/73.03 |
| 7,283,319 B2 | * | 10/2007 | Hobbet et al. | 360/75 |
| 8,140,751 B1 | * | 3/2012 | Wang | 711/114 |
| 2001/0044907 A1 | | 11/2001 | Yoshimoto et al. | |
| 2002/0144057 A1 | * | 10/2002 | Li et al. | 711/112 |
| 2006/0193073 A1 | | 8/2006 | Hakamata et al. | |
| 2007/0003227 A1 | * | 1/2007 | Mori | 386/95 |

FOREIGN PATENT DOCUMENTS

| | | |
|---|---|---|
| EP | 1 770 497 A2 | 4/2007 |
| JP | 2000-293314 A | 10/2000 |
| JP | 3368475 B2 | 11/2002 |

OTHER PUBLICATIONS

Charles Weddle et al. "PARAID: A Gear-Shifting Power-Aware RAID." Feb. 2007. USENIX. FAST 2007.*
B. Mottram, Maid—"Massive Array of Idle Disk", Jan. 2009, 12 pages, Veridictus Associates, Inc., Manitou Springs, CO., USA.

* cited by examiner

*Primary Examiner* — Charles Rones
*Assistant Examiner* — Nathan N Sadler
(74) *Attorney, Agent, or Firm* — Mattingly & Malur, PC

(57) ABSTRACT

To maintain reliability even when the repetition of the power saving control for storage systems occurs frequently due to the access from the host computer. During the course of controlling the operation mode of the drives, the controller measures the start/stop cycle count and the load/unload cycle count, calculates the S/S wear-out rate showing the ratio of the measured value of the start/stop cycle count to the first upper limit value and the L/U wear-out rate showing the ratio of the measured value of the load/unload cycle count to the second upper limit value, and for the drives in the idle operation mode, selects the low-speed rotation operation mode if the S/S wear-out rate is greater than the L/U wear-out rate, or selects the standby operation mode if the S/S wear-out rate is less than the L/U wear-out rate.

4 Claims, 19 Drawing Sheets

| VENDOR | DRIVE MODEL NUMBER | DRIVE TYPE | STORAGE CAPACITY | UPPER LIMIT VALUE OF START AND STOP CYCLE COUNT | UPPER LIMIT VALUE OF LOAD AND UNLOAD CYCLE COUNT |
|---|---|---|---|---|---|
| 200 | 201 | 202 | 203 | 204 | 205 |
| A | WWWW | SAS HDD | 300GB | 50,000 | 0 |
| A | XXXX | SATA HDD | 1TB | 50,000 | 300,000 |
| B | YYYY | SAS HDD | 300GB | 20,000 | 0 |
| C | ZZZZ | SAS HDD | 73TB | 0 | 0 |
| .. | .. | .. | .. | .. | .. |

FIG.3

| ID | CONFIGURATION DRIVE (CHASSIS NUMBER / DRIVE LOCATION NUMBER) | DRIVE TYPE | RAID LEVEL | LDEV ID | UNUSED CAPACITY |
|---|---|---|---|---|---|
| 1 | 1/0, 1/1, 1/2, 1/3 | SAS HDD | RAID5 | #1, #2, #3, #4 | 20GB |
| 2 | 1/4, 1/5, 1/6, 1/7 | SAS HDD | RAID6 | #5, #6, #7 (SAVE) | 20GB |
| .. | .. | .. | .. | .. | .. |

| ID 400 | S/S UPPER LIMIT VALUE 401 | L/U UPPER LIMIT VALUE 402 | S/S CURRENT VALUE 403 | L/U CURRENT VALUE 404 | S/S INCREASE FREQUENCY 405 | L/U INCREASE FREQUENCY 406 | LAST ACCESS TIME 407 | LONG ACCESS INTERVAL FREQUENCY 408 | OPERATION MODE 409 ↙ T3 |
|---|---|---|---|---|---|---|---|---|---|
| 1 | 200 | 0 | 20,000 | 0 | 18 TIMES PER DAY | 0 | 2008/11/25 03:27:14 | 30 TIMES | NORMAL |
| 2 | 1,000 | 10,000 | 50,000 | 300,000 | 20 TIMES PER DAY | 25 TIMES PER DAY | 2008/11/25 04:52:03 | 52 TIMES | STANDBY |
| .. | .. | .. | .. | .. | .. | .. | .. | .. | .. |

FIG.5

| | 500 | 501 | 502 | 503 | |
|---|---|---|---|---|---|
| | LDEV NUMBER | AFFILIATED RG NUMBER | LAST ACCESS TIME | LONG ACCESS INTERVAL COUNT | |
| | 1 | 1 | 2008/11/25 01:39:42 | 3,000 TIMES | T4 |
| | 2 | 1 | 2008/11/25 03:27:14 | 5,000 TIMES | |
| | 3 | 2 | 2008/11/24 22:58:53 | 4,000 TIMES | |
| | : | : | : | : | |

FIG.16

ESTIMATED RG LIFE

| RG ID | HDD TYPE | S/S CYCLE COUNT WEAR-OUT RATE | L/U CYCLE COUNT WEAR-OUT RATE | ESTIMATED CYCLE COUNT LIFE |
|---|---|---|---|---|
| 1 | SAS | 18.0% | – | 2012/12/03 |
| 2 | SAS | 9.2% | – | 2013/07/16 |
| 3 | SAS | 13.7% | – | 2013/04/24 |
| 4 | SATA | 12.1% | 12.1% | 2013/03/30 |
| 5 | SATA | 19.2% | 19.2% | 2012/08/13 |
| 6 | SATA | 24.8% | 24.8% | 2012/05/21 |

Tabs: PARAMETER SETTING | ESTIMATED RG LIFE | LDEV RELOCATION

FIG.18

PARAMETER SETTING | ESTIMATED RG LIFE | LDEV RELOCATION

SUGGESTED LDEV RELOCATION

| LDEV ID TO BE RELOCATED | RELOCATION TYPE | RELOCATION SOURCE RG | | | RELOCATION DESTINATION RG | | | LDEV ID TO BE REPLACED | EXECUTE RELOCATION |
| --- | --- | --- | --- | --- | --- | --- | --- | --- | --- |
| | | RG ID | HDD TYPE | RAID LEVEL | RG ID | HDD TYPE | RAID LEVEL | | |
| 2 | REPLACE | 1 | SAS | RAID5 | 2 | SAS | RAID5 | 10 | ● PERMIT ○ DENY |
| 6 | MOVE | 7 | SATA | RAID6 | 8 | SATA | RAID6 | NONE | ● PERMIT ○ DENY |

RELOCATION EXECUTION TIMING ● IMMEDIATE
○ IN [01:00 ▼] HOURS
○ START AT [23:00 ▼]

[OK] [CANCEL]

STORAGE SYSTEM FOR MAINTAINING HARD DISK RELIABILITY

TECHNICAL FIELD

This invention generally relates to a storage system equipped with a plurality of storage devices, and particularly to a storage system with greater reliability in the power saving control of storages.

BACKGROUND ART

Recently, in accordance with the increase in the amount of data, electric power consumption of data centers has dramatically increased, and power saving is required not only in servers which are primary IT (information technology) devices, it is also required in storage systems.

One of the power saving technologies of a storage system equipped with hard disk drives (hereinafter referred to as HDDs) is MAID (Massive Array of Inactive Disks). MAID is the technology where power saving is realized by spinning down or powering off an HDD or a plurality of HDDs which are not accessed. In this case, if the plurality of HDDs are divided into RAID (Redundant Array of Inexpensive Disks) groups, it is common to spin down or power off the HDDs that belong to the RAID groups.

Two types of methods of automatically executing MAID are interlocking the power saving control with the operation schedule and interlocking the power saving control with access from the host (host computer) such as a server. A typical example of the former method is interlocking the power saving control with the backup window; that is, spinning up the HDDs that configure the RAID group in which the backup data is stored at the start of a scheduled backup, and then spinning down the relevant HDDs at the end of the backup control.

Among the methods included in the latter type of interlocking with the host access, spinning down the HDDs that belong to the RAID groups if there is no access from the host over a certain length of time is well known (refer to Patent Document 1).

Furthermore, for periodical host access, the method of executing the HDD power saving control in accordance with the access cycle is suggested (refer to Patent Document 2).

DESCRIPTION OF RELATED ARTS

[Patent Documents] Patent Document 1 Japanese Unexamined Patent Application Publication No. 2000-293314
Patent Document 2
Japanese Patent No. 3368475

DISCLOSURE OF THE INVENTION

Generally, for switching an HDD to the power saving status, the HDD is spun down by issuing a command from the idle status where a magnetic disk is rotating at a regular rate and a magnetic head is on the disk or powered off. The HOD manages the start/stop cycle count internally, and the start/stop cycle count is increased by one with spin up from the spin down status or by power on from the power-off status. If the HDD is spun down, the magnetic head contacts the disk. If start and stop is repeated, the magnetic head and the spindle motor will be exhausted. Therefore, the upper limit value of the start/stop cycle count is set, for example, to 50,000 times.

Certain types of HDDs have power saving modes such as the unload idle status where a magnetic disk is unloaded from the disk or the low-speed rotation status where power saving is achieved by slowing down the disk rotation speed compared with the normal rotation speed. The upper limit number of controls also exists in the idle status and those power saving modes.

For example, an HDD manages the load/unload cycle count internally, and if the status is switched from the idle status to the unload idle status or the low-speed rotation status, and then switched back to the idle status, the load/unload cycle count is increased by one. As with the start/stop cycle count, the upper limit load/unload cycle count is set, for example, to 300,000 times.

Furthermore, logical devices (hereinafter referred to as LDEVs) that configure logical units (hereinafter referred to as LUs) accessed from a host exist in one or more RAID groups. When executing MAID by interlocking with the host access, in accordance with intermittent access from the host to a certain LU, the repetition of spin up and spin down of the HDDs that configure a RAID group might occur frequently. In that case, the start/stop cycle count of the HDD will increase and exceed the upper limit value of the start/stop cycle count in less than three to five years that is the general hard disk life of HDDs, and the reliability of storage systems may become impaired.

This invention was devised in view of the problems of the above-mentioned conventional technology. Thus, an object of this invention is to provide a storage system capable of maintaining the reliability even when the repetition of power saving control for storages occurs frequently due to the access from the host computer.

In order to achieve the above-mentioned object, this invention is characterized in comprising a controller connected to a host computer via a network and which identifies access from the host computer, specifies a storage to be subject to the access among the plurality of storages, sends and receives data to and from the specified storage, and controls an operation mode of the plurality of storages configuring each of the RAID groups. The controller controls the operation mode of the RAID group either as an idle operation mode which causes the storage to enter an idle status, or a plurality of power saving operation modes which cause the storages to enter a power saving status that saves more power than the idle operation mode. The controller includes a local memory for storing the respective upper limit values of a plurality of control cycle counts showing an execution count of a plurality of control cycles in which the idle operation mode and each of the power saving operation modes make a circuit. During the course of controlling the operation mode of the storages, the controller measures each of the control cycle counts, and selects a power saving operation mode among the plurality of power saving operation mode based on the measured value for deconcentrating the increase in the measured value of each of the control cycle count in relation to each of the upper limit values in the RAID group.

According to this invention, the reliability of storage systems can be improved even when the repetition of power saving control for power saving of storages occurs frequently due to the access from the host computer.

BRIEF DESCRIPTION OF DRAWINGS

FIG. 2 is a configuration diagram of a drive management table;

FIG. 3 is a configuration diagram of an RG configuration management table;

FIG. 4 is a configuration diagram of an RG status management table;

FIG. 5 is a configuration diagram of an LDEV status management table;

FIG. 16 is an example of the screen showing an estimated RG life;

FIG. 18 is an example of the screen for putting a query about the LDEV relocation to the administrator.

REFERENCE NUMERALS

10 Storage System
11 Basic Chassis
12 Additional Chassis
14 Drive
20 and 30 Controller
21 and 31 CPU
22 and 32 Local Memory
23 and 33 Channel Controller
24 and 34 Drive Controller
25 and 35 Cache Memory
26 and 36 Data Transfer Controller
28 Management Terminal
80 Host Computer

BEST MODE FOR CARRYING OUT THE INVENTION

Embodiments of this invention are now explained with reference to the attached drawings.

In this embodiment, during the course of controlling the operation mode of storages configuring each of the RAID groups, the controller measures each of the control cycle counts, and selects a power saving operation mode among the plurality of power saving operation mode based on the measured value for deconcentrating the increase in the measured value of each of the control cycle counts in relation to each of the upper limit values in the RAID group.

Figure 1:
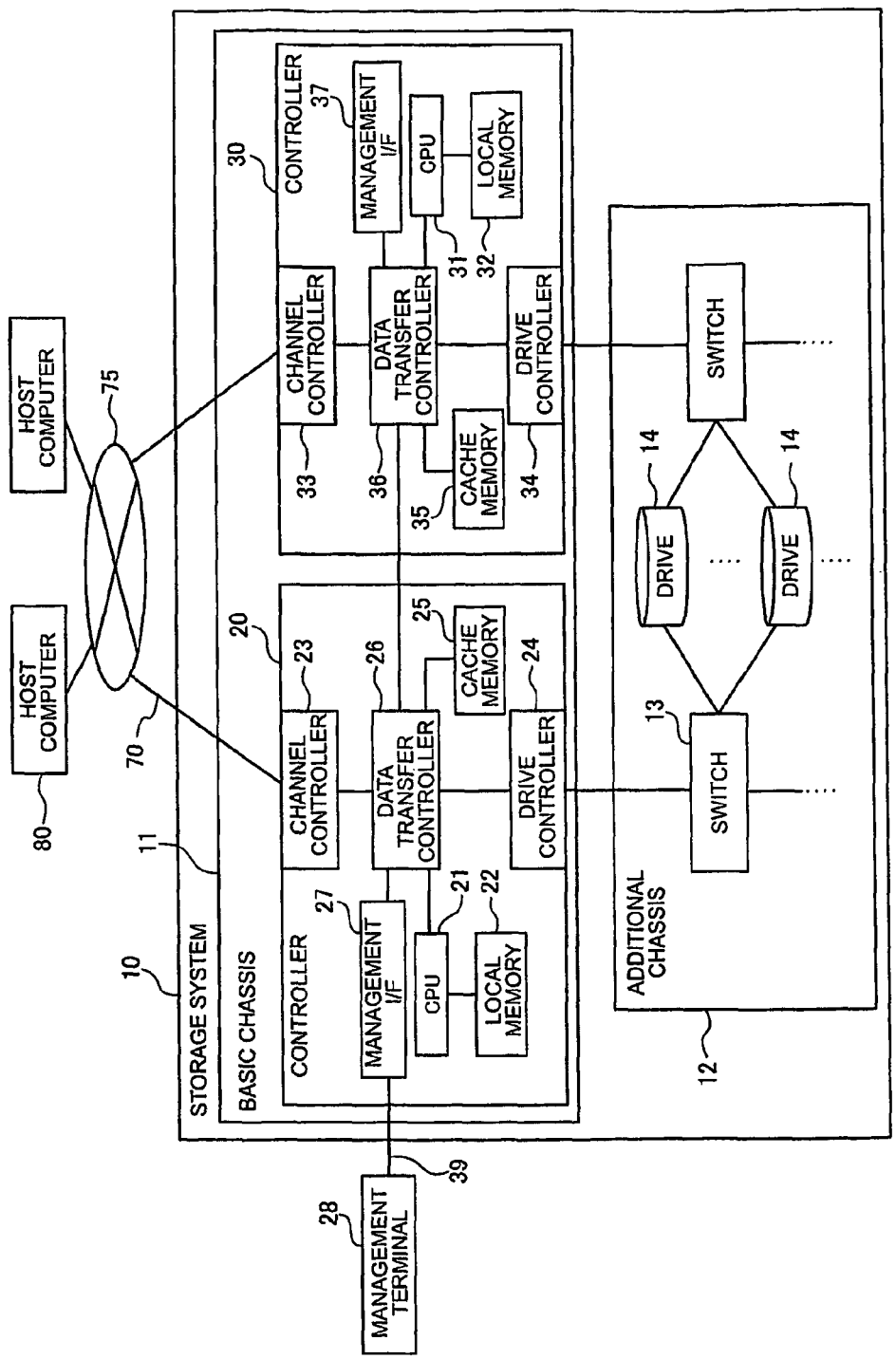
FIG. 1 is a configuration diagram of a storage system showing an embodiment of this invention.

FIG. 1 is a configuration diagram of a storage system 10 that shows an embodiment of this invention. In FIG. 1, the storage system 10 is connected to a host computer 80 via a host interface 70 and a network 75. The host computer 80 requests the input and output of data to the storage system 10.

The storage system 10 includes a basic chassis 11 and an additional chassis 12. The basic chassis 11 is provided with a controller 20 and a controller 30. The controller 20 includes a CPU (Central Processing Unit) 21, a local memory 22, a cache memory 25, a channel controller 23, a drive controller 24, a data transfer controller 26, and an management I/F 27.

The CPU 21 is the processor which executes programs stored in a local memory 22 and controls the respective components in the basic chassis 11 and the additional chassis 12. This CPU 21 is capable of, for example, controlling the data input/output processing to and from drives 14 installed in the additional chassis 12, and it also possesses the timing function.

Multiple drives 14 configure a storage, and each driver 14 is connected to a drive controller 24 via a switch 13. In this case, the plurality of drives 14 are divided into one or more RAID groups (hereinafter referred to as RGs). As the storage system 10 is made redundant by RGs, the reliability in hardware failure of the drives 14 is improved. One or more logical devices (LDEVs) that are virtual logical areas are configured in the storage area of an RG.

Figure 6:
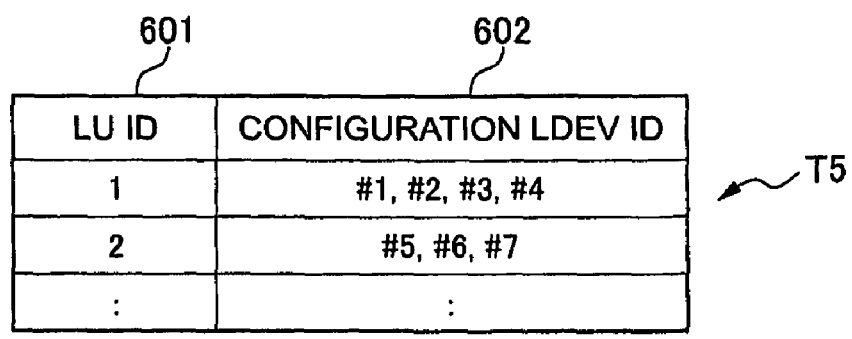
FIG. 6 is a configuration diagram of an LU status management table.

The local memory 22 stores the programs to be executed by the CPU 21 and various databases. The programs and data stored in the drives 14 are copied to the local memory if necessary. Furthermore, the local memory 22 stores, for example, information on the drive management table T1 as shown in FIG. 2, or information on the RG configuration management table T2, the RG status management table T3, the LDEV status management table T4, the LU configuration management table T5 as shown in FIGS. 3 and 6. The contents shown in these tables are described later.

The cache memory 25 is a storage area which temporarily stores write data that is input from the host computer 80 to the storage system 10 and read data that is output from the storage system 10 to the host computer 80. The cache memory 25 is configured of, for example, a non-volatile memory or a volatile memory that is backed up by a battery. If [the cache memory 25] is configured of a non-volatile memory, it can hold the stored cache data even if the power is turned off. Furthermore, if [the cache memory 25] is configured of a volatile memory that is backed up by a battery, it can hold the stored cache data even if the power is turned off as long as the battery capacity allows it.

The channel controller 23 is the interface connected to the host computer 80, and receives data input/output requests from the host computer, such as block input/output requests and file input/output requests. The drive controller 24 is the interface connected to the drive 14, and makes data input/output requests to the drive 14 by using a specific protocol, for example, a SCSI (Small Computer System Interface) protocol. The data transfer controller 26 controls the data transfer path between the host computer 80 and the drive 14 according to commands from the CPU 21. The controller 20 and the controller 30 are duplicated so as to improve availability.

The controller 30 has a similar configuration as the controller 20, including a CPU 31, a local memory 32, a cache memory 35, a channel controller 33, a drive controller 34 and a data transfer controller 36. The CPU 31, the local memory 32, the cache memory 35, the channel controller 33, the drive controller 34 and the data transfer controller 36 correspond with the CPU 21, the local memory 22, the cache memory 25, the channel controller 23, the drive controller 24 and the data transfer controller 26, respectively.

When the data transfer controller 26 of the controller 20 and the data transfer controller 36 of the controller 30 are connected to each other, the data written into the cache memory 25 of the controller 20 is transferred to the controller 30 and written into the cache memory 35. Similarly, the data written into the cache memory 35 of the controller 30 is transferred to the controller 20 and written into the cache memory 25. As a result, the cache data written into the cache memory 25 and the cache memory 35 is duplicated. Since the controller 20 and the controller 30 have identical functions, execution by the controller 20 is described below.

The management terminal 28 is connected to the management I/F 27 via the communication network 39 configured of LAN (Local Area Network). The management terminal 28 has a Web browser and is capable of setting RGs, LDEVs and LUs. Furthermore, as described later, the management terminal 28 can specify the interval and timing of LDEV relocation and display the estimated life seen from the perspective of the cycle count of each RG.

Furthermore, the basic chassis 11, though not shown in the drawing, is equipped with a power supply module, and converts AC voltage supplied from the outside of the storage 10 to DC voltage. DC voltage is converted to lower voltage as necessary, and is provided to the respective components in the basic chassis 11.

The drive 14 installed in the additional chassis 12 is a storage medium that includes magnetic heads and disks and stores programs, user data and the like, and includes a SAS (Serial Attached SCSI) interface as an external interface. The form of interface is not limited thereto, and it may also be FC (Fibre Channel) or SATA (Serial Advanced Technology Attachment). Each drive 14 includes duplicate input/output ports and is connected to the two drive controllers 24 and 34 via the switches 13.

In the storage system 10, the mixed installation of different types of drives 14 such as SAS and SATA is possible. The power saving operation modes and the cycle count when, for example, SATA HDDs, SAS HDDs, SATA SSDs (Solid State Drives), SAS SSDs are used as drives 14 that are installed in the storage system 10, are described below. Firstly, a case where a SATA HDD is used as the drive 14 is described below.

A SATA HDD has the low-speed rotation operation mode and the standby operation mode as power saving operation modes in addition to the active operation mode where data read and write is executed and the idle operation mode which is a waiting operation mode. The disk rotation speed in the active operation mode and the idle operation mode is, for example, 7,200 rpm. The disk rotation speed in the low-speed rotation operation mode is, for example, 4,500 rpm. In the low-speed rotation operation mode, by slowing down the disk rotation speed compared with the active operation mode and the idle operation mode, power saving can be achieved. The standby status is the operation mode where the disk rotation is completely stopped. In this case, power saving can also be achieved because the disk does not rotate.

When comparing the low-speed rotation operation mode with the standby operation mode, the power saving effect is greater in the standby operation mode than in the low-speed rotation operation mode. Meanwhile, as for the transition time from the low-speed rotation operation mode or the standby operation mode to the active operation mode, the transition time from the low-speed rotation operation mode to the active operation mode is shorter, and a quicker response can be realized.

Furthermore, a SATA HDD stores the start/stop cycle count showing the spin up and spin down repetition count inside the drive, and each time the disk is spun up, the start/stop cycle count is increased by one. Similarly, a SATA HDD stores the load/unload cycle count showing the load and unload repetition count inside the drive, and each time the magnetic head is loaded, the load/unload cycle count is increased by one.

If an HDD receives a read command or a write command externally when it is in the standby operation mode, it makes a transition from the standby operation mode to the active operation mode. At this time, the disk is spun up from the stopped status, reaches the normal rotation speed, and then a magnetic head is loaded from the ramp position onto the disk. In that case, the start/stop cycle count and the load/unload cycle count are increased by one each.

If an HDD receives a read command or a write command from the outside when it is in the low-speed rotation operation mode, it makes a transition from the low-speed rotation operation mode to the active operation mode. At this time, the disk is spun up from the low-speed operation mode, reaches the normal rotation speed, and then a magnetic head is loaded from the ramp position onto the disk. In that case, the load/unload cycle count is increased by one each, though the start/stop cycle count is not increased.

The timing when the start/stop cycle count is increased in an HDD is not limited to the above-mentioned cases. Increasing the start/stop cycle count by one at a spin down of the disk or increasing the load/unload cycle count by one at an unload of the magnetic head may also be permitted.

In other cases, if an HDD receives, for example, the Set Features command externally when it is in the idle operation mode, it makes a transition from the idle operation mode to the low-speed rotation operation mode. At this time, after the magnetic head is unloaded to the ramp position, the disk rotation speed decreases from 7,200 rpm to 4,500 rpm, though the start/stop cycle count and the load/unload cycle count are not increased.

If an HDD receives the Standby command externally when it is in the idle operation mode, it makes a transition from the idle operation mode to the standby operation mode. At this time, after the magnetic head is unloaded to the ramp position, the disk rotation is stopped, though the start/stop cycle count and the load/unload cycle count are not increased.

For the start/stop cycle count and the load/unload cycle count, the upper limit values specified by the drive vendor exist, and in this embodiment, 50,000 times is set as the upper limit value of the start/stop cycle count while 300,000 times is set as the upper limit value of the load/unload cycle count. The start/stop cycle count and the load/unload cycle count are measured by each drive 14 as part of the SMART information, and the measured values are supposed to be transferred to the controllers 20 and 30 by a special external command.

As operation modes that the controller 20 manages per RG, the active operation mode for executing read operations of reading data from the disk of the drive 14 and write operations of writing data to the disk of the drive 14 while rotating the disk of the drive 14, the idle operation mode which is waiting for read or write operations of the disk of the drive 14 while rotating the disk of the drive 14, the low-speed rotation operation mode for rotating the disk of the drive 14 with lower speed than the idle operation mode, and the standby operation mode for stopping the disk rotation of the drive rotation are set.

Furthermore, as the first power saving control cycle count showing the execution count of the first power saving control cycle in which the circuit of the idle operation mode and the standby operation mode is made, the RG start/stop cycle count is set, and the upper limit value of the RG start/stop cycle count is set to 50,000 times as the first upper limit value. Meanwhile, as the second power saving control cycle count showing the execution count of the second power saving control cycle in which the circuit of the idle operation mode and one of the power saving modes among the low-speed rotation operation mode and the standby operation mode is made, the RG load/unload cycle count is set, and the upper limit value of the RG load/unload cycle count is set to 300,000 times as the second upper limit value.

In this case, during the course of controlling the operation mode of the drives 14 in the RG, the controller 20 measures the RG start/stop cycle count and the RG load/unload cycle count, and with reference to these measured values, for the drives 14 in the RG in the idle operation mode, either the low-speed rotation operation mode or the standby operation mode is selected as the operation mode for deconcentrating the increase of the RG start/stop cycle count up to the upper limit value and the increase of the RG load/unload cycle count up to the upper limit value in the identical RG.

Secondly, a case where a SAS HDD is used as a drive 14 is described below.

A SAS HDD has the standby operation mode as a power saving operation mode in addition to the active operation mode where data read and write is executed and the idle operation mode which is a waiting operation mode. The disk rotation speed in the active operation mode and the idle operation mode is, for example, 15,000 rpm. The standby operation mode is the status where the disk rotation is completely stopped, and power saving can be achieved by switching the HDD to the standby operation mode.

Furthermore, a SAS HDD stores the start/stop cycle count showing the spin up and spin down repetition frequency inside the drive, and each time the disk is spun up, the start/stop cycle count is increased by one.

If an HDD receives the Start Unit command and the notify primitive from the outside when it is in the standby operation mode, it makes a transition from the standby operation mode to the idle operation mode. In this case, though the disk is spun up from the stopped status and reaches the normal rotation speed, a magnetic head is always on the top of the disk. In that case, the start/stop cycle count is increased by one. The timing when the start/stop cycle count is increased in an HDD is not limited to the above-mentioned case. Increasing the start/stop cycle count by one at a spin down of the disk may also be permitted.

If an HDD receives the Stop Unit command externally when it is in the idle operation mode, it makes a transition from the idle operation mode to the standby operation mode. In this case, though the disk rotation is stopped, the start/stop cycle count is not increased.

For the start/stop cycle count, the upper limit value set by the drive vendor exists, and in this embodiment, 50,000 times is set as the upper limit value of the start/stop cycle count. As for SAS HDDs, since the magnetic head is always on the top of the disk, the upper limit value of the load/unload cycle count is not set. Furthermore, the start/stop cycle count is, in response to the Log Sense command from the outside, transferred to the controllers 20 and 30 as the values stored in each drive 14.

In this case, during the course of controlling the operation mode of the drives 14 in the RG, the controller 20 measures the RG start/stop cycle count, and with reference to these measured values, so as to inhibit the increase of the RG load/unload cycle count up to the upper limit value, it determines whether to continue to rotate the drives 14 in the RG in the idle operation mode or to make a transition from the idle operation mode to the standby operation mode.

Next, a case where a SATA SSD or a SAS SSD is used as the drive 14 is described below.

A SATA SSD has the same type of interface as a SATA HDD, and runs with the SATA protocol. Furthermore, a SAS SSD has the same type of interface as a SAS HDD, and runs with the SAS protocol. An SSD installs a flash memory which is a non-volatile semiconductor memory as a storage medium, and even in the idle operation mode, compared with an HDD, generally achieves a power saving reduction of one tenth or less per unit of storage capacity. Furthermore, as an SSD does not have a mechanical drive part, no specific cycle count or upper limit value for power saving control is set.

Next, the configuration of a drive management table T1 is described with reference to FIG. 2. The drive management table T1, in normal operation, is stored in the local memory 22. This drive management table T1 is configured of fields 200, 201, 202, 203, 204 and 205. In the field 200, the names of the vendors of the drives that might be installed, A, B, C and others are stored. In the field 201, information on drive model numbers are stored, and in the field 202, SAS HDD, SATA HDD or others are stored as information on drive types. Information on the storage capacity of the drives is stored in the field 203, the values showing the upper limits of start/stop cycle counts, such as 50,000, are stored in the field 204, and the values showing the upper limits of load/unload cycle counts, such as 300,000, are stored in the field 205.

As for the fields 204 and 205, for each of SAS HDDs for which no upper limit values of the load/unload cycle count are specified, and for each of SATA SSDs and SAS SSDs for which no upper limit values of the start/stop cycle count and the load/unload cycle count are specified, 0 is stored. The values to be stored in each field can be specified before shipment, and can be recorded at the time of the operation from the management terminal 28.

Next, in setting one or more RGs configured of one or more drives 14 in the additional chassis 12, though the mixed installation of different types of drives such as SAS HDDs and SATA HDDs is permitted in the additional chassis 12, different types of drives cannot configure the same RG.

In this case, an RG can be configured with reference to the commands from the management terminal 28 connected to the storage system 10. For example, as shown in FIG. 3, an RG can be configured according to an RG configuration management table T2. The RG configuration management table T2 stored in the local memory 22 is configured of fields 300, 301, 302, 303, 304 and 305.

The field 300 stores IDs showing RGs' serial numbers. The field 301 stores configuration drives information configured of chassis numbers and drive location numbers showing the physical location of the drives 14 that configure the RG. The field 302 stores drive types, each of which values shows any of SATA HDD, SAS HDD, SATA SSD and SAS SSD, as information to show the type of drive 14 that configures the RG. The field 303 stores RAID levels. The RAID levels of the RGs are shown, whose values show, for example, RAID 5, RAID 6 or RAID 1. The field 304 stores LDEV IDs. The IDs of the LDEVs set in the RGs are shown. As for the field 304, for RG 2, areas for saving are taken, which are set by the management terminal 28. The field 305 stores the amount of free space in the RGs.

Next, the configuration of an RG status management table T3 is shown in FIG. 4. The RG status management table T3 is configured of fields 400, 401, 402, 403, 404, 405, 406, 407, 408 and 409. The field 400 stores IDs showing RGs' serial numbers. The field 401 shows the upper limit values of the RG start/stop cycle count (S/S upper limit values). In this field 401, the smallest upper limit value of the start/stop cycle count in the HDDs that configure the RG, which is also, when the RG is configured by the management terminal 28, the value the controller 20 referred to in the upper limit values of the start/stop cycle count (the values in the field 204) of the drive management table T1, is stored. If an RG is configured of drives 14 of SSDs, 0 is stored in the field 401.

The method of setting the RG start/stop cycle count is not limited to the above-mentioned method. For example, among the HDDs that configure an RG, the smallest value as the start/stop cycle count multiplied by 0.8 as a safety factor may also be set as the upper limit value of the RG start/stop cycle count.

The field 402 shows the upper limit values of the RG load/unload cycle count (L/U upper limit values). In this field 402, the smallest upper limit value of the load/unload cycle count in the HDDs that configure the RG, which is also, when the RG is configured by the management terminal 28, the value the controller 20 referred to in the upper limit values of the load/unload cycle count (the values in the field 205) of the drive management table T1, is stored. If an RG is configured of HDDs and SSDs that have no upper limit values of the load/unload cycle count, 0 is stored in this field 402.

The method of setting the RG load/unload cycle count is not limited to the above-mentioned method. For example, among HDDs that configure an RG, the smallest value as the load/unload cycle count multiplied by 0.8 as a safety factor may also be set as the upper limit value of the RG load/unload cycle count.

The field 403 stores current values of the RG start/stop cycle count (S/S current values). In this field 403, the largest upper limit value of the start/stop cycle count in the drives that configure the RG, which is also the value gained when the RG is configured by the management terminal 28 and the CPU 21 receives SMART information from the drives 14, is stored.

The field 404 stores current values of the RG load/unload cycle count (L/U current values). In the field 404, the largest upper limit value of the load/unload cycle count in the drives that configure the RG, which is also the value gained when the RG is configured by the management terminal 28 and the CPU 21 receives SMART information from the drives 14, is stored.

The field 405 stores the increase frequency of RG start/stop cycles (S/S increase frequency). This field 405 shows the increase frequency of the current values of the RG start/stop cycles per day. The values of this field 405 are reset daily by the CPU 21.

The field 406 stores the increase frequency of RG load/unload cycles (L/U increase frequency). This field 406 shows the increase frequency of the current values of the RG load/unload cycles per day. The values of this field 406 are reset daily by the CPU 21.

The field 407 shows the time of the last access. This field 407 stores the time when the latest read or write to the RG is completed.

The field 408 stores the long access interval frequency. This field 408 shows the number of cases in the last 24 hours where the interval of accesses to the relevant RG is longer than the power saving control latency set by the management terminal 28 (the latency for executing power saving control after the last access is executed). The long access interval frequency is updated if the access interval is longer than the power saving control latency even if the RG operation mode is maintained to the idle operation mode by the CPU 21.

An RG where the long access interval frequency is high, is likely to be immediately spun up after the HDDs configuring the relevant RG is caused to make a transition to the standby operation mode or the low-speed rotation operation mode, which means it is likely that the start/stop cycle count and the start/stop cycle count tend to increase.

The field 409 shows operation modes. This field 409 shows the operation mode of each RG, any of the normal operation mode, the low-speed rotation operation mode, the standby operation mode, and power-off. The normal operation mode is the status in which the disks of the drives 14 that configure the RG rotate normally and the magnetic heads are on the disks, including the idle operation mode which is a waiting status and the active operation mode where a command is executed.

Next, the configuration of an LDEV status management table T4 is described with reference to FIG. 5. The LDEV status management table T4 is configured of fields 500, 501, 502 and 503. Information on the LDEV status management table T4 is stored in the local memory 22 by the management terminal 28 on the RG when one or more LDEVs are configured. In this embodiment, the capacity of LDEVs is assumed to be fixed.

The field 500 stores LDEV numbers, which are the serial numbers given in the order of the LDEV setting. The field 501 stores each LDEV's RG number. In this field 501, the last RG numbers to which relevant LDEVs belong are stored. The field 502 stores the last access time. This field 502 stores the time when the latest read or write to the RG is completed. The field 503 stores the long access interval count. This field 503 shows the cumulative total number of cases where the interval of accesses to the relevant LDEV is longer than the power saving control latency set by the management terminal 28.

Next, the configuration of an LU configuration management table T5 is described with reference to FIG. 6. The LU configuration management table T5 is configured of fields 600 and 601. The field 600 stores LU serial numbers to identify the LUs. The field 601 stores configuration LDEV IDs, showing the LDEV numbers that configure the LUs. That is, the LU configuration management table T5 is intended to show which LDEVs configure LUs when the storage system 10 is accessed by the host computer 80, and is set by the management terminal 28.

In that case, the host computer 80 can send and receive data to and from the storage system 10 by specifying the LU numbers and the logical addresses in the LUs, by which the LDEV ID and the address in the LDEV to be accessed is calculated by the order of LDEV IDs that configure the field 601.

In this case, in installing drives 14 in the additional chassis 12, one or more spare drives can be installed as spare drives 14 for failure. For example, if failure occurs in a certain drive 14, and even if no access from the host computer is allowed, the CPU 21 executes correction copy from the user data and the parity data that is stored in other drives 14 that belongs to the identical RG, which can recover the user data and the parity data of the drive 14 in which the failure has occurred.

Furthermore, the additional chassis 12, though not shown in the figure, installs the power supply module, and converts AC voltage provided from the outside of the storage 10 to DC voltage. DC voltage is converted to lower voltage as necessary, and is provided to the respective components in the additional chassis 12.

Note that, though the example shown in FIG. 1 has one basic chassis 11 in the storage system 10, a plurality of basic chassis 11 may also be installed. Furthermore, though the storage system 10 has one additional chassis 12, a plurality of additional chassis 12 may also be installed. Furthermore, a storage system 10 can be configured of one chassis that is the combination of a basic chassis 11 and an additional chassis 12.

In the storage system 10, by the management terminal 28, whether to execute normal spin down control interlocking with the host or to execute, as described later, cycle count deconcentration in an RG can be selected. An example for executing this setting is shown in FIG. 7.

Figure 7:
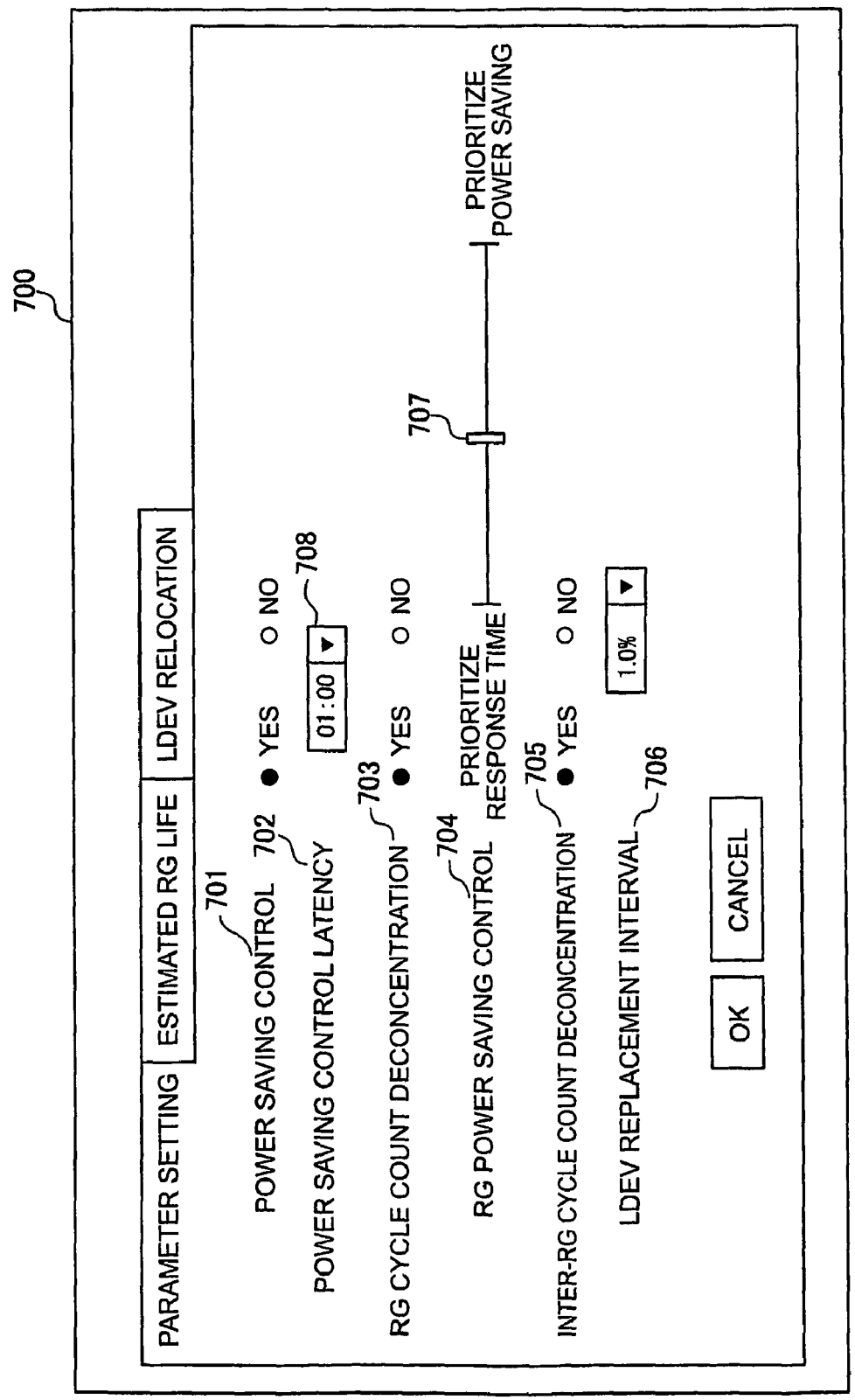
FIG. 7 is a diagram showing an example display of the power saving control setting screen.

In FIG. 7, on the setting screen 700, as areas for setting parameters, the power saving control setting area 701, the power saving control latency setting area 702, the RG cycle count deconcentration setting area 703, the RG power saving control setting area 704, the inter-RG cycle count deconcentration setting area 705, and the LDEV switch interval setting area 706 are set, and the slide button 707 is set for selecting, in executing power saving control in the RG, whether to prioritize the response time or power saving.

In executing power saving control by setting the power saving control setting area 701, if the latency before executing power saving control for an RG with no access (hereinafter referred to as the power saving control latency) is to be set, an optional time can be set in the selection area 708 that corresponds with the power saving control latency setting area 702.

Figure 8:
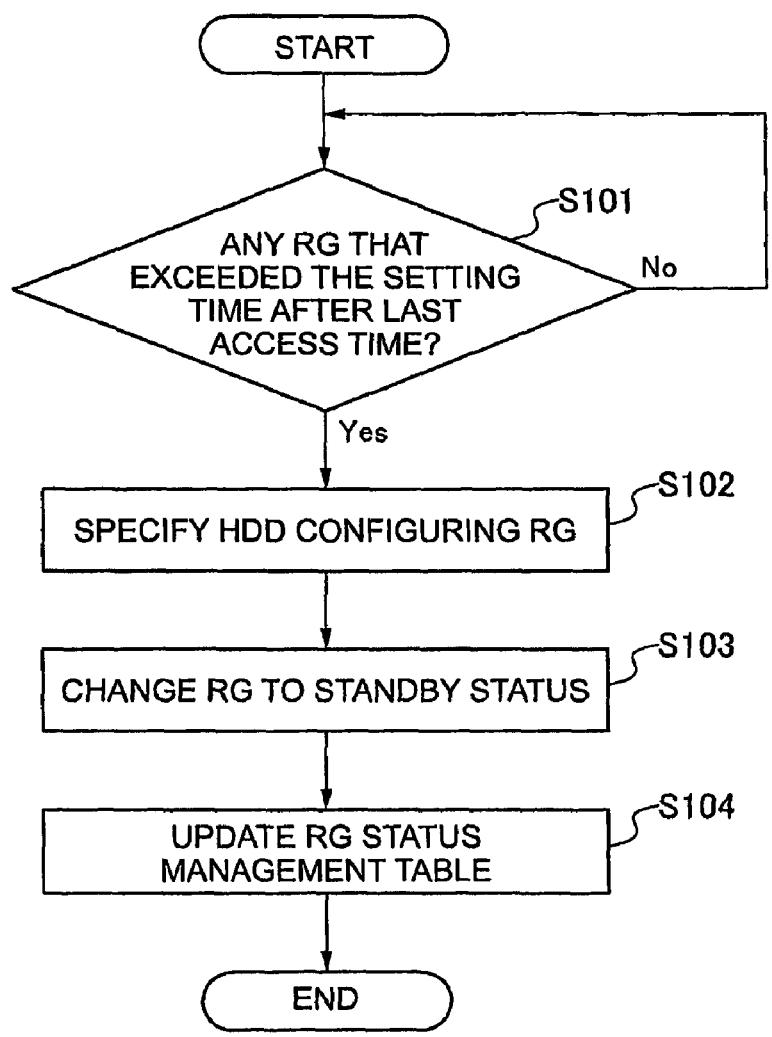
FIG. 8 is a flowchart to describe the normal spin down control for an RG.

On the power saving control parameter setting screen 700, if "NO" is selected in the RG cycle count deconcentration setting area 703, normal spin down interlocking with the host is executed for the RG. The normal spin down control interlocking with the host is described below with reference to the flowchart in FIG. 8.

Firstly, in standing by for access from the host computer 80, the CPU 21 searches the RG status management table T3 periodically, and checks whether the RG operation mode of the field 409 is the "normal operation mode," and, at the same time, whether there are any RGs that have exceeded the power saving latency set in the selection area 708 since the last access time of the field 407 (S101). If there are such RGs, the CPU 21 refers to the RG configuration management table T2, and specifies the HDDs that configure the RG (S102). Secondly, the CPU 21 executes the control for switching the HDDs that configure the RG to the standby operation mode (S103). Finally, the CPU 21 updates the operation mode of the relevant RG as the "standby operation mode" on the RG status management table T3 (S104), and completes the processing of this routine.

Next, on the power saving control parameter setting screen 700, if "YES" is selected in the RG cycle count deconcentration setting area 703, the RG cycle count deconcentration is executed.

Figure 9:
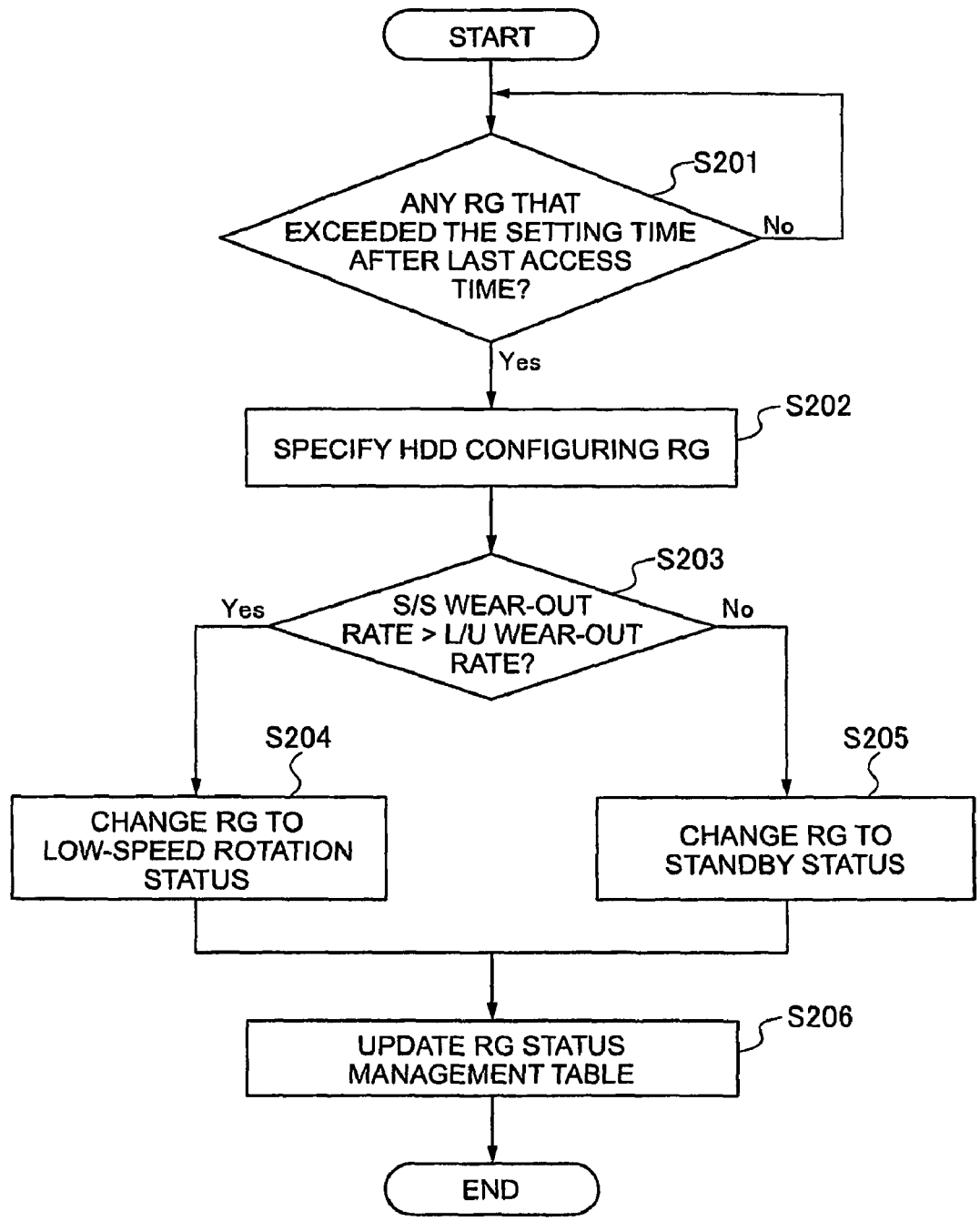
FIG. 9 is a flowchart to describe the processing of selecting the operation mode for an RG configured of SATA HDDs.

The power saving control for an RG when the RG cycle count deconcentration control is executed is described below with reference to the flowchart in FIG. 9. Firstly, a case where an RG is configured of SATA HDDs that have two upper limit values, the start/stop cycle count and the load/unload cycle count, is described. For SATA HDDs, power saving control is executed for the equal deconcentration of the wear-out rates of the cycle counts to the two upper limit values, for example, the wear-out rate of the start/stop cycle count showing the ratio of the start/stop cycle count current value to the upper limit value of the start/stop cycle count and the wear-out rate of the load/unload cycle count showing the ratio of the load/unload cycle count current value to the upper limit value of the load/unload cycle count.

Specifically, in standing by for access from the host computer 80, the CPU 21 searches the RG status management table T3 periodically, and checks whether the RG operation mode of the field 409 is the "normal operation mode," and at the same time, whether there are any RGs that have exceeded the power saving latency set in the selection area 708 since the last access time of the field 407 (S201). If there are such RGs, the CPU 21 refers to the RG configuration management table T2, and specified the HDDs that configure the RGs (S202).

For the relevant RG, the CPU 21 compares the wear-out rate of the RG start/stop cycle count rate with the wear-out rate of the RG load/unload cycle count (S203). In this case, the wear-out rate of the RG start/stop cycle count and the wear-out rate of the RG load/unload cycle count can be ascertained by referring to the RG status management table T3 in FIG. 4 and calculating as follows.

RG start/stop cycle count wear-out rate(%)=RG start/stop cycle count current value/upper limit value of RG start/stop cycle count×100

RG load and unload frequency wear-out rate(%)=RG load/unload cycle count current value/upper limit value of RG load/unload cycle count×100

In S203, when the wear-out rate of the RG start/stop cycle count is greater than the wear-out rate of the RG load and unload count, the CPU 21 causes the HDDs that configure the relevant RG to make a transition from the idle operation mode to the low-speed rotation operation mode (S204).

Meanwhile, in S203, when the wear-out rate of the RG start/stop cycle count is less than the wear-out rate of the RG load and unload count, the CPU 21 causes the HDDs that configure the relevant RG to make a transition from the idle operation mode to the standby operation mode (S205).

Finally, the CPU 21, on the RG status management table T3, updates the operation mode of the relevant RG as "low-speed rotation operation mode" or "standby operation mode" (S206), and completes the processing of this routine.

Figure 10:
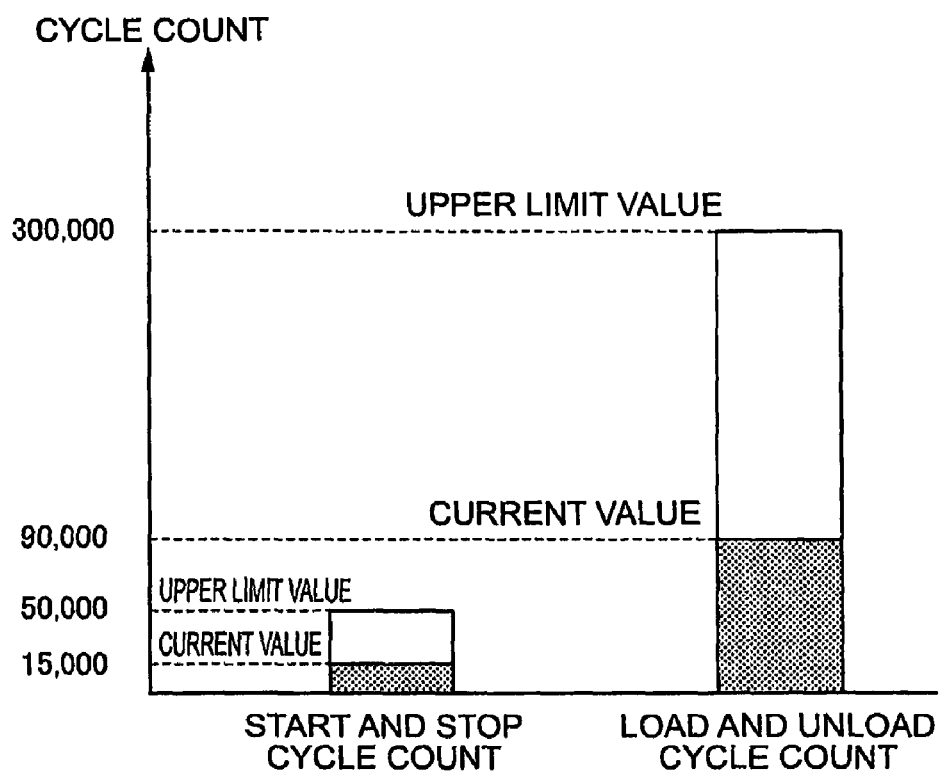
FIG. 10 is a diagram to describe that the wear-out rate of the start/stop cycle count of an RG and the wear-out rate of the load/unload cycle count of the RG.

By repeating the above-mentioned control, in an RG, as shown in FIG. 10, it is possible to equally deconcentrate the wear-out rate of the RG start/stop cycle count to the upper limit value and the wear-out rate of the RG load/unload cycle count to the upper limit value, which improves the reliability of storage systems 10.

That is, when the wear-out rate of the RG start/stop cycle count is greater than the wear-out rate of the RG load and unload frequency, if the HDDs that configure the relevant RG make a transition from the idle operation mode to the low-speed rotation operation mode and if, afterwards, the HDDs that configure the relevant RG make a transition from the low-speed rotation operation mode to the idle operation mode, the start/stop cycle count that is the first power saving control cycle including the idle operation mode and the standby operation mode is not increased, but the load/unload cycle count that is the second power saving control cycle including the idle operation mode and the low-speed rotation operation mode is increased by one.

Meanwhile, when the wear-out rate of the RG start/stop cycle count is less than the wear-out rate of the RG load and unload frequency, if the HDDs that configure the relevant RG make a transition from the idle operation mode to the standby operation mode and if, afterwards, the HDDs that configure the relevant RG make a transition from the standby operation mode to the idle operation mode, the start/stop cycle count and the load/unload cycle count are both increased by one each.

Therefore, if an HDD in the idle operation mode makes a transition to the low-speed rotation operation mode and the HDD in the low-speed rotation operation mode makes a transition to the idle operation mode afterwards, only the load/unload cycle count is increased by one while, if an HDD in the idle operation mode makes a transition to the standby operation mode and then makes a transition to the idle operation mode again, the start/stop cycle count and the load/unload cycle count are both increased by one each.

As a result, the increase of the start/stop cycle count to the upper limit value and the increase of the load/unload cycle count to the upper limit value can be equally deconcentrated by repeating the operation of either causing the HDDs that configure the relevant RG make a transition from the idle operation mode to the low-speed rotation operation mode, if the wear-out rate of the RG start/stop cycle count is greater than the wear-out rate of the RG load and unload count, or causing the HDDs that configure the relevant RG make a transition from the idle operation mode to the standby operation mode if the wear-out rate of the RG start/stop cycle count is less than the wear-out rate of the RG bad and unload count.

Furthermore, for equally deconcentrating the increase of the start/stop cycle count to the upper limit value and the increase of the load/unload cycle count to the upper limit value, it is also possible to make a transition from the idle operation mode to the low-speed rotation operation mode if the increase rate of the measured value of the start/stop cycle count to the upper limit value (first upper limit value) is greater than the increase rate of the measured value of the load/unload cycle count to the upper limit value (second upper limit value) or to make a transition from the idle operation mode to the standby operation mode if the increase rate of the measured value of the start/stop cycle count to the upper limit value (first upper limit value) is less than the increase rate of the measured value of the load/unload cycle count to the upper limit value (second upper limit value)

According to this embodiment, as the wear-out rate of the RG start/stop cycle count to the upper limit value and the wear-out rate of the RG load/unload cycle count to the upper limit value can be equally deconcentrated, which can contribute to improving the reliability of storage systems 10 even if, due to the access from the host computer 80, the repetition of the power control for drives 14 occurs frequently.

Second Embodiment

Another embodiment in which the cycle counts are deconcentrated in an RG configured of SATA HDDs is described below. This embodiment describes changing the transition destination of the operation mode depending on the frequency by which the access interval to the RG exceeds the power saving latency.

Figure 11:
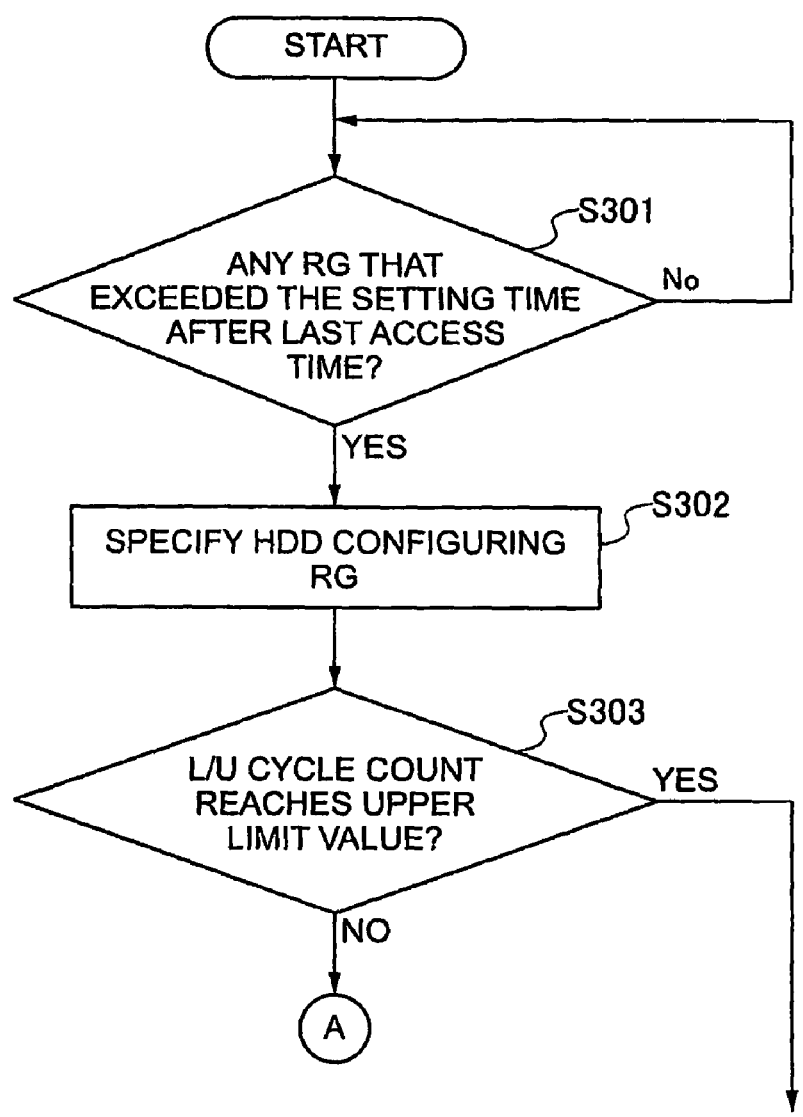
FIG. 11 is a flowchart to describe the processing of selecting the operation mode for an RG configured of SATA HDDs.
Figure 12:
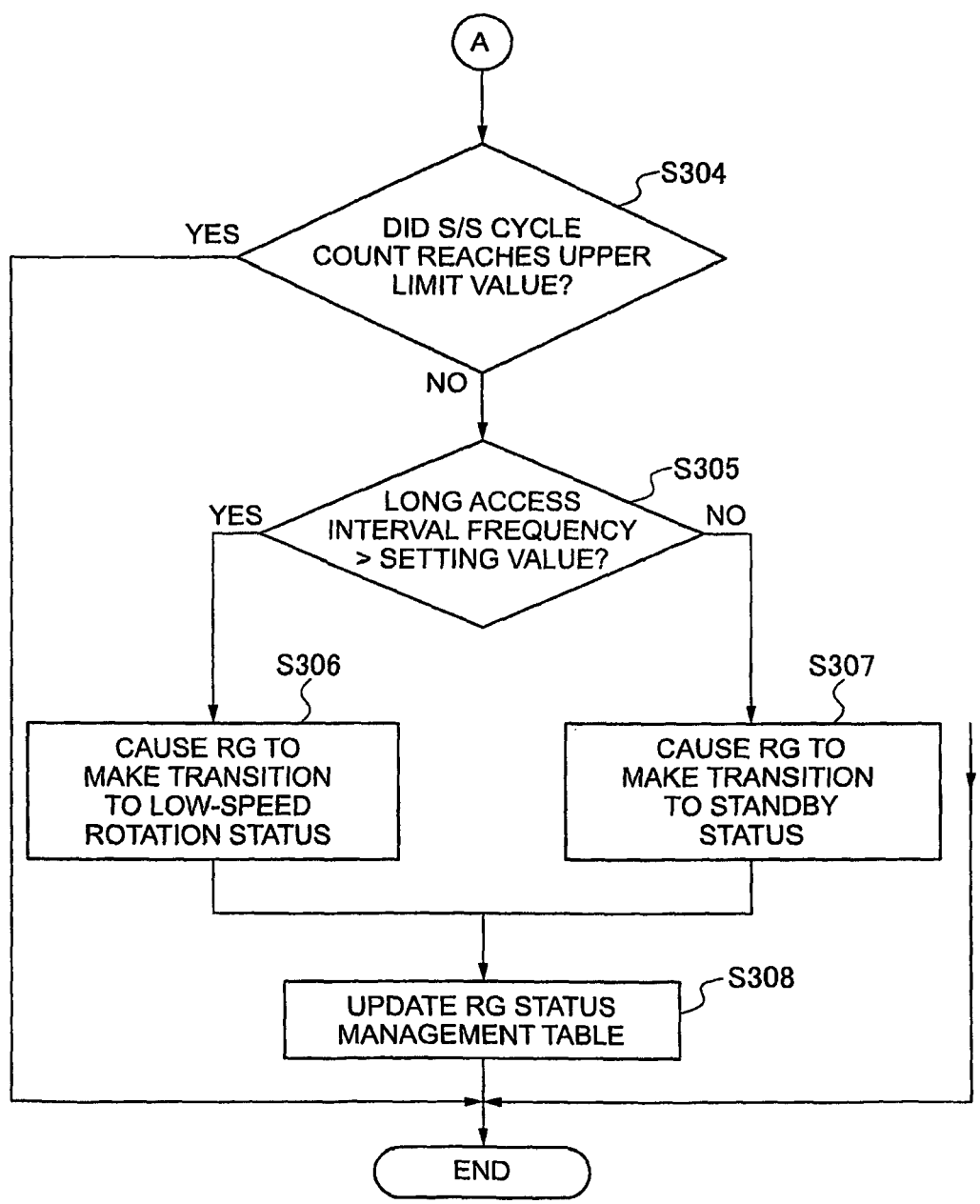
FIG. 12 is a flowchart to describe the processing of selecting the operation mode for an RG configured of SATA HDDs.

Next, the operation of this embodiment is described below, with reference to the flowcharts in FIGS. 11 and 12.

In standing by for access from the host computer 80, the CPU 21 searches the RG status management table T3 periodically, and checks whether the RG operation mode of the field 409 is the "normal operation mode," and at the same time, whether there are any RGs that have exceeded the power saving latency set in the selection area 708 since the last access time of the field 407 (S301). If there are such RGs, the CPU 21 refers to the RG configuration management table T2, and specifies the HDDs that configure the RGs (S302).

Next, the CPU 21 determines whether the current value of the load/unload cycle count of the field 404 has reached the upper limit value or not, and completes the processing of this routine without executing power saving control for the HDDs that configure the relevant RG if the current value of the load/unload cycle count has reached the upper limit value or, if the current value of the load/unload cycle count has not reached the upper limit value, determines whether the current value of the start/stop cycle count of the field 403 has reached the upper limit value or not (S304).

In S304, if the current value of the start/stop cycle count has reached the upper limit value, the CPU 21 completes the processing of this routine without executing power saving control for the HDDs that configure the relevant RG and, if the current value of the start/stop cycle count has not reached the upper limit value, determines whether the long access interval frequency is greater than the setting value (S305).

The setting value is set by the administrator by the GUI of the management terminal 28, using the slide button shown in FIG. 7. In that case, the setting value increases as the slide button 707 is moved closer toward "Prioritize power saving," and it decreases as the button is moved closer toward the "Prioritize response time."

In S305, if the long access interval frequency is greater than the setting value, the CPU 21 causes the HDDs that configure the relevant RG to make a transition from the idle operation mode to the low-speed rotation operation mode (S306). Meanwhile, in S305, if the long access interval frequency is less than the setting value, the CPU 21 causes the HDDs that configure the relevant RG to make a transition from the idle operation mode to the standby operation mode (S307).

Finally, the CPU 21, on the RG status management table T3, updates the operation mode of the relevant RG as "low-speed rotation operation mode" or "standby operation mode" (S308), and completes the processing of this routine.

By repeating the above-mentioned control, the increase of the start/stop cycle count and the RG load/unload cycle count is deconcentrated, which improves the reliability of storage systems 10.

That is, when the long access interval frequency is greater than the setting value, if the HDDs that configure the relevant RG make a transition from the idle operation mode to the low-speed rotation operation mode and if, afterwards, the HDDs that configure the relevant RG make a transition from the low-speed rotation operation mode to the idle operation mode, the load/unload cycle count is increased by one though the start/stop cycle count is not increased.

Meanwhile, when the long access interval frequency is less than the setting value, if the HDDs that configure the relevant RG make a transition from the idle operation mode to the standby operation mode and if, afterwards, the HDDs that configure the relevant RG make a transition from the standby operation mode to the idle operation mode, the start/stop cycle count and the load/unload cycle count are both increased by one each.

Therefore, if an HDD in the idle operation mode makes a transition to the low-speed rotation operation mode and the HDD in the low-speed rotation operation mode makes a transition to the idle operation mode afterwards, only the load/unload cycle count is increased by one while, if an HDD in the idle operation mode makes a transition to the standby operation mode and then makes a transition to the idle operation mode again, the start/stop cycle count and the load/unload cycle count are both increased by one each.

As a result, the increase of the start/stop cycle count and the increase of the load/unload cycle count can be deconcentrated by repeating the operation of either causing the HDDs that configure the relevant RG make a transition from the idle operation mode to the low-speed rotation operation mode, if the long access interval frequency is greater than the setting value, or causing the HDDs that configure the relevant RG make a transition from the idle operation mode to the standby operation mode if the long access interval frequency is less than the setting value.

According to this embodiment, as the increase of the start/stop cycle count and the increase of the load/unload cycle count can be deconcentrated, which can contribute to improving the reliability of storage systems 10 even if, due to the access from the host computer 80, the repetition of the power saving control for drives 14 occurs frequently.

Furthermore, according to this embodiment, for the setting value set with the slide button 707 in FIG. 7, the RGs whose spin up frequency is likely to increase can be turned to the low-speed rotation operation mode, it is possible to realize short response time to the host access.

Furthermore, as the criteria in S305, not only the long access interval frequency but the increase rate of the RG start/stop cycle count and the increase rate of the RG load/unload cycle count that are managed in the RG status management table T3 are also available.

Third Embodiment

Next, another embodiment in which an RG is configured of SAS HDDs that have the upper limit value of the start/stop cycle count is described. This embodiment describes selecting the operation mode, whether the idle operation mode or the standby operation mode, depending on the frequency by which the access interval to the RG exceeds the power saving latency.

Figure 13:
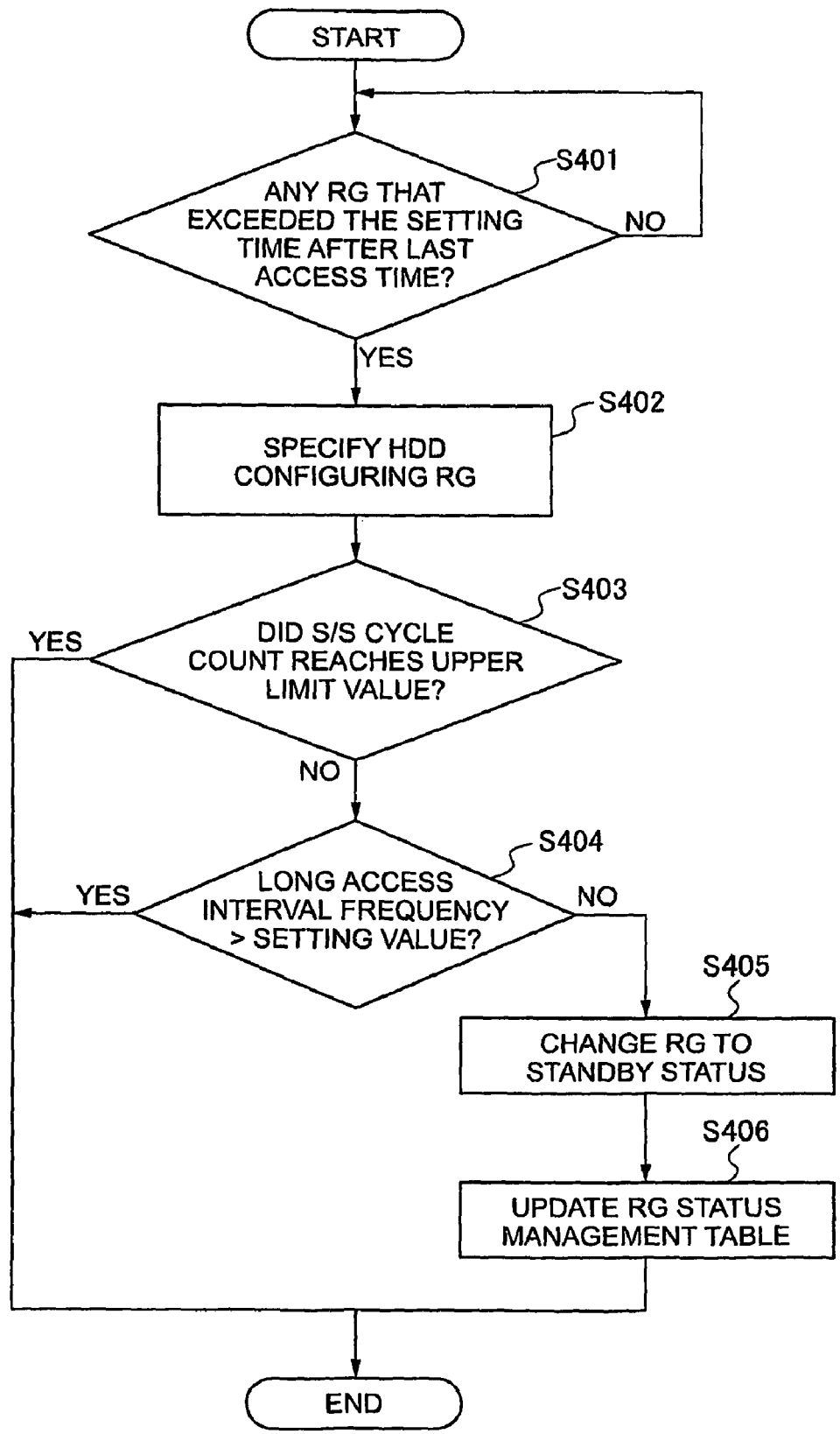
FIG. 13 is a flowchart to describe the processing of selecting the operation mode for an RG that is configured of SAS HDDs.

The operation of this embodiment is described below, with reference to the flowchart in FIG. 13.

In standing by for access from the host computer 80, the CPU 21 searches the RG status management table T3 periodically, and checks whether there are such RGs that the RG operation mode of the field 409 is the "normal operation mode" and that have exceeded the power saving latency set in the selection area 708 since the last access time of the field 407 (S401). If there are such RGs, the CPU 21 refers to the RG configuration management table T2, and specifies the HDDs that configure the RGs (S402).

Next, the CPU 21 determines whether the current value of the start/stop cycle count of the field 403 has reached the upper limit value or not (S403), and completes the processing of this routine keeping the HDDs that configure the relevant RG in the idle operation mode if the current value of the start/stop cycle count has reached the upper limit value or, if the current value of the start/stop cycle count has not reached the upper limit value, refers to the RG status management table T3 and determines whether the long access interval frequency is greater than the setting value or not (S404). In that case, the setting value can be set arbitrarily by using the slide button 707.

In S404, if the long access interval frequency is greater than the setting value, the CPU 21 completes the processing of this routine without executing any operation for the HDDs that configure the relevant RG, that is, leaving them in the idle operation mode, and if the long access interval frequency is less than the setting value, causes the HDDs that configure the relevant RG to make a transition from the idle operation mode to the standby operation mode (S405).

Finally, the CPU 21, on the RG status management table T3, updates the operation mode of the relevant RG as "standby operation mode" (S406), and completes the processing of this routine.

By repeating the above-mentioned control, the increase of the start/stop cycle count can be inhibited, which improves the reliability of storage systems 10.

That is, if the long access interval frequency is high and the HDDs that configure the relevant RG make a transition from the idle operation mode to the standby operation mode, it might make a transition to the idle operation mode or to the active operation mode immediately after that, the increase of the start/stop cycle count can be inhibited by keeping them in the idle operation mode.

According to this embodiment, as the increase of the start/stop cycle count can be inhibited, which can contribute to improving the reliability of storage systems 10 even if, due to the access from the host computer 80, the repetition of power saving control for drives 14 occurs frequently.

Furthermore, according to this embodiment, for the setting value set with the slide button 707, the RGs whose spin up frequency is likely to increase is left in the normal rotation status, it is possible to realize short response time to the host access.

Furthermore, for RGs configured of SATA SSDs or SAS SSDs, though no start/stop cycle count or load/unload cycle count is specified, the power saving effect is high even in the idle operation mode and power saving control is not executed.

Operation in Accessing LDEVs

Figure 14:
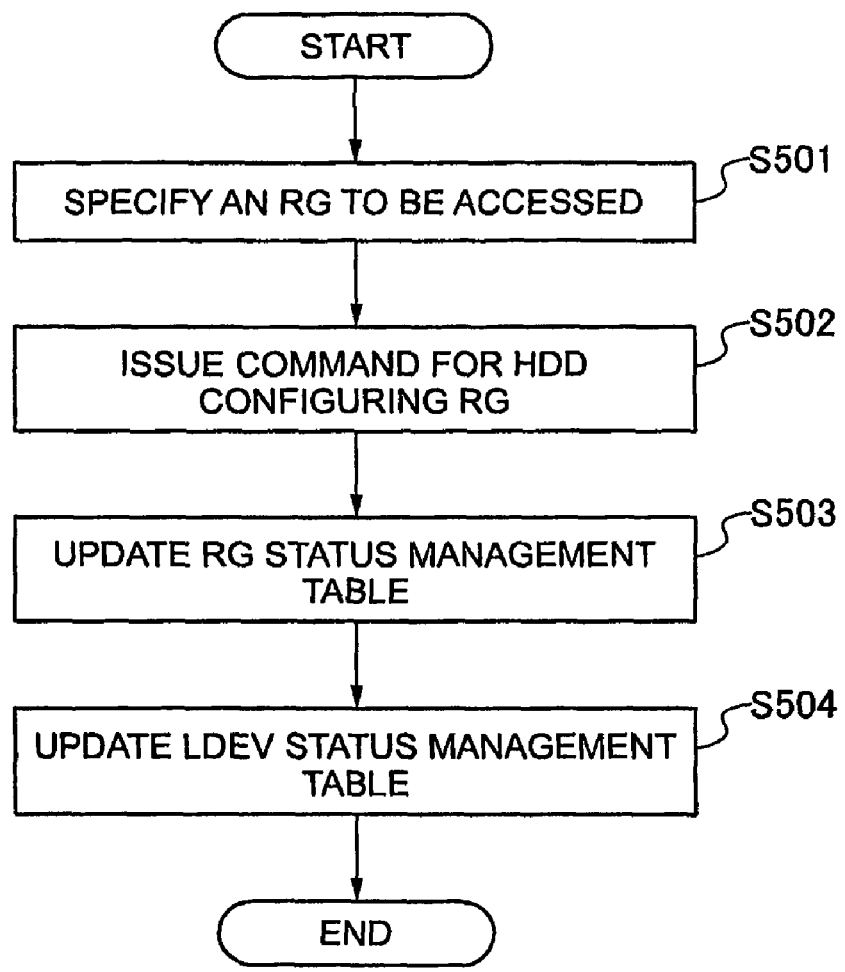
FIG. 14 is a flowchart to describe the processing of accessing an RG in the power saving operation mode.

Next, the operation in cases where LDEVs in an RG in the standby operation mode are accessed by the host computer 80 is described with reference to the flowchart in FIG. 14. Note that the description refers to an RG configured of SATA HDDs.

If a storage system 10 receives a command for LUs from the host computer 80, the CPU 21 refers to the LU configuration management table T5 and the RG configuration management table T2, and specifies which RG to access (S501).

Then, the CPU 21 issues a read command or a write command to the HDDs that configure the RG. By this, the HDDs spin up the disk, and after the disk reaches the normal rotation speed, it reloads a magnetic head onto the disk and executes the read or write command (S502).

After the command has been executed, the CPU 21, in the RG status management table T3, increases the current value of the RG start/stop cycle count, the current value of the RG load/unload cycle count, the increase frequency of the RG start/stop cycle count and the increase frequency of the RG load/unload cycle count by one each, updates the long access interval frequency and the last access time, and updates the RG operation mode from the "standby operation mode" to the "normal operation mode" (S503). In this case, the CPU 21 updates the long access interval frequency because, as the RG was in the standby status in the beginning, the amount of time longer than the power saving latency has already passed since the last access time.

Finally, the CPU 21 increases the long access interval count in the LDEV status management table T4 by one, updates the last access time (S504), and completes the processing of this routine.

As for the operation in the following cases where LDEVs in an RG in the low-speed rotation operation mode is accessed by the host computer 80, the similar operation is executed as in the above-mentioned cases where LDEVs in an RG in the standby operation mode is accessed by the host computer 80 except that, after the command has been executed, the CPU 21, in the RG status management table T3, does not increase the current value of the RG start/stop cycle count.

Fourth Embodiment

Next, the method of estimating the life of HDDs that configure an RG is described. In this embodiment, the life is estimated by calculating the date of reaching the upper limit value based on the upper limit value of the RG start/stop cycle count, the upper limit value of the RG load/unload cycle count, the current value of the RG start/stop cycle count, the current value of the RG load/unload cycle count, the increase frequency of the RG start/stop cycle count and the increase frequency of the RG load/unload cycle count, which are managed on the RG status management table T3.

Figure 15:
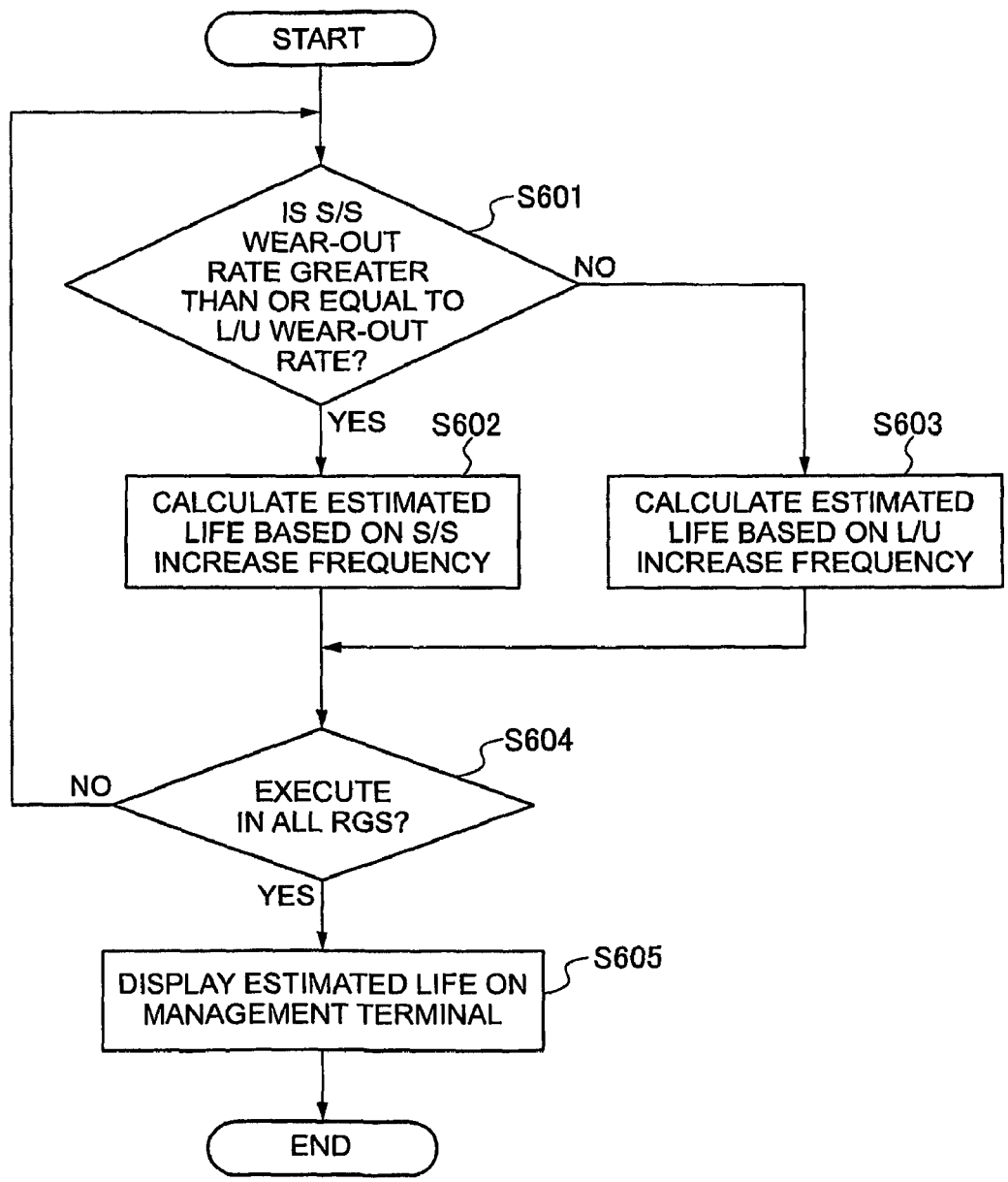
FIG. 15 is a flowchart to describe estimated RG life.

Next, the method of estimating the life of HDDs that configure an RG is described with reference to the flowchart in FIG. 15. The processing in this embodiment is executed daily, before the increase frequency of the RG start/stop cycle count and the increase frequency of the RG load/unload cycle count are reset to 0.

Firstly, as for an RG with the RG ID=1, the CPU 21 compares the wear-out rate of the RG start/stop cycle count and the wear-out rate of the RG load/unload cycle count (S601).

In S601, if the wear-out rate of the RG start/stop cycle count is greater than or equal to the wear-out rate of the RG load/unload cycle count, the CPU 21 estimates the RG life based on the increase frequency of the RG start/stop cycle count (S602). The estimate equation in this case is as follows.

Estimated RG life=(current date)+(upper limit value of RG start/stop cycle count−current value of RG start/stop cycle count)÷(increase frequency of RG start/stop cycle count)

In S601, if the wear-out rate of the RG start/stop cycle count is less than or equal to the wear-out rate of the RG load/unload cycle count, the CPU 21 estimates the RG life based on the increase frequency of the RG load/unload cycle count (S603).

The estimate equation in this case is as follows.

Estimated RG life=(current date)+(upper limit value of RG load/unload cycle count−current value of RG load/unload cycle count)÷(increase frequency of RG load/unload cycle count)

Similarly, as for an RG with the RG ID=2, the CPU 21 estimates life, and executes the same for all the RGs (S604).

Subsequently, the CPU 21 displays the estimated lives of all the RGs on the management terminal 28 (S605), and completes the processing of this routine.

An example display of estimated lives on the management terminal 28 is shown in FIG. 16.

On the screen shown in FIG. 16, information on the RG ID 720, the HDD type 721, the wear-out rate of the RG start/stop cycle count 722, the wear-out rate of the RG load/unload cycle count 723, and the estimated cycle life 724 is displayed. RG numbers are displayed in the RG ID 720, HDD types such as SAS or SATA are displayed in the HDD type 721, the start/stop cycle count wear-out rates of the RGs are displayed in the wear-out rate of the RG start/stop cycle count 722, the load and unload frequency wear-out rates of the RGs are displayed in the wear-out rate of the RG load/unload cycle count 723, and the dates of the estimated RG lives are displayed in the estimated cycle life 724.

According to this embodiment, as RG life can be ascertained from the perspective of the power saving control cycle count, it becomes easier for the administrator to determine the necessity of executing the LDEV relocation that is described later.

Fifth Embodiment

In this embodiment, after spinning up an RG in the standby operation mode or in the low-speed rotation operation mode and updating the RG status management table T3, if it is confirmed that the wear-out rate has increased by a specific value only, the LDEV relocation control is executed for the deconcentration of the cycle count among RGs.

Figure 17:
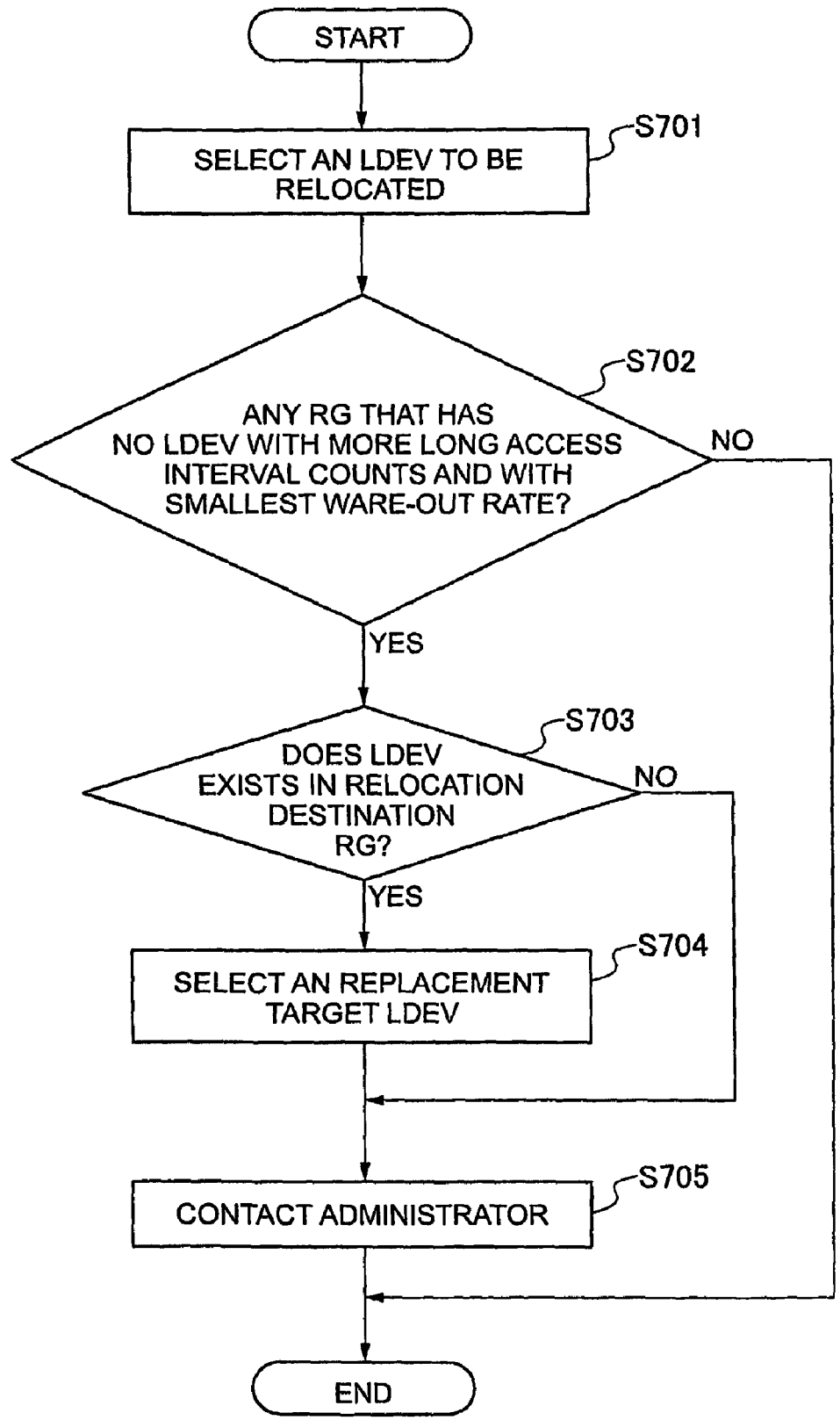
FIG. 17 is a flowchart to describe the LDEV relocation among RGs.

In executing LDEV relocation, the operation in deconcentrating the cycle count among RGs is described with reference to the flowchart in FIG. 17. Note that, in this embodiment, for simplifying the control, the capacity of each LDEV is considered identical, and as shown in the RG configuration management table T2 in FIG. 3, special areas for saving LDEVs (hereinafter referred to as saving areas) with the identical capacity as LDEVs are supposed to be saved in one of the RGs in a storage system 10. Furthermore, the interval of LDEV relocation is, as shown in FIG. 17, set on the screen of the storage management client, and in this embodiment, LDEV replacement is supposed to be executed each time the RG wear-out rate increases by 1.0%.

Furthermore, for the HDDs in this embodiment that have the upper limit value of the start/stop cycle count and the upper limit value of the load/unload cycle count, such as SATA HDDs, the wear-out rate in LDEV relocation is supposed to be the mean value of the wear-out rates obtained from the RG status management table T3 while, for the HDDs that have only the upper limit value of the start/stop cycle count, such as SAS HDDs, it is supposed to be the wear-out rate of the RG start/stop cycle count obtained from the RG status management table T3. Furthermore, the interval of the increase in the wear-out rate that triggers LDEV relocation is, as shown in FIG. 7, set on the management terminal 28.

Next, the processing for deconcentrating the cycle count among RGs is described with reference to the flowchart in FIG. 17. Firstly, the LDEV to be relocated to another RG (hereinafter referred to as an LDEV to be relocated) is selected. In this case, the CPU 21 refers to the LDEV status management table T4, selects an LDEV with the highest count of long access interval among the LDEVs that belong to the relevant RG (hereinafter referred to as a relocation source RG), and specifies this LDEV as the LDEV to be relocated (S701).

The RG as the relocation destination of the LDEV to be relocated (hereinafter referred to as a relocation destination RG) is selected. In this case, the CPU 21 selects the RG which has no LDEV whose long access interval count is higher than the LDEV to be relocated and at the same time whose wear-out rate is the smallest, and specifies it as a relocation destination RG (S702). The RG which has no LDEV whose long access interval count is higher than the LDEV to be relocated must be selected for preventing any RGs to which the LDEVs with the high count of long access interval have been relocated before from being selected.

If there is no relevant RG in S702, this processing of this routine is terminated without executing LDEV relocation, and if a relocation destination RG can be selected, the CPU 21 refers to the RG configuration management table T2 and confirms whether there is an LDEV in the relocation destination RG.

If an LDEV is confirmed in S703, the CPU 21 specifies the "relocation type" flag information to be stored in the local memory 22 as "replacement," and selects the replacement target LDEV with the LDEV to be relocated (hereinafter referred to as the replacement target LDEV) in the relocation destination RG (S704). In this case, the CPU 21 refers to the LDEV status management table T4, selects an LDEV with the lowest count of long access interval among the LDEVs that belong to the relevant RG, and specifies it as the replacement target LDEV. If there is no LDEV confirmed in S703, the CPU 21 specifies the "relocation type" flag information as "Move."

After that, the CPU 21 puts a query about the LDEV relocation to the administrator (S705). An example of the screen displayed on the management terminal 28 in this case is shown in FIG. 18.

On the screen shown in FIG. 18, information on the LDEV ID to be relocated 730, the relocation type 731, the relocation source RG 732, the relocation destination RG 733, the replacement target LDEV 734, and executing relocation 735 is displayed. The numbers of the LDEVs to be relocated are displayed in the LDEV ID to be relocated 730, and either "replace" or "move" is displayed in the relocation type 731. In the relocation source RG 732 and the relocation destination RG 733, RG numbers, HDD types and RAID levels are displayed. The numbers of the replacement target LDEVs are displayed in the replacement target LDEV 734. In executing relocation 735, "permit" and "deny" are displayed, and the radio button selected by the administrator turns to ● (a black circle).

Here, the administrator can specify whether to permit or deny the LDEV relocation and the timing of executing the relocation. Before the administrator selects the processing, the wear-out rates of the other RG are increased by 1%, and when the CPU 21 executes the next LDEV relocation processing, a suggested LDEV relocation is additionally displayed on the screen.

According to this embodiment, the administrator can specify whether to permit or deny the LDEV relocation and the timing of executing the relocation.

Though the interval of the RG wear-out rate for LDEV relocation has been explained as 1% in this embodiment, other values may also be permitted.

Sixth Embodiment

This embodiment executes the replacement or the move of LDEVs at the time specified by the administrator on the screen in FIG. 18.

Figure 19:
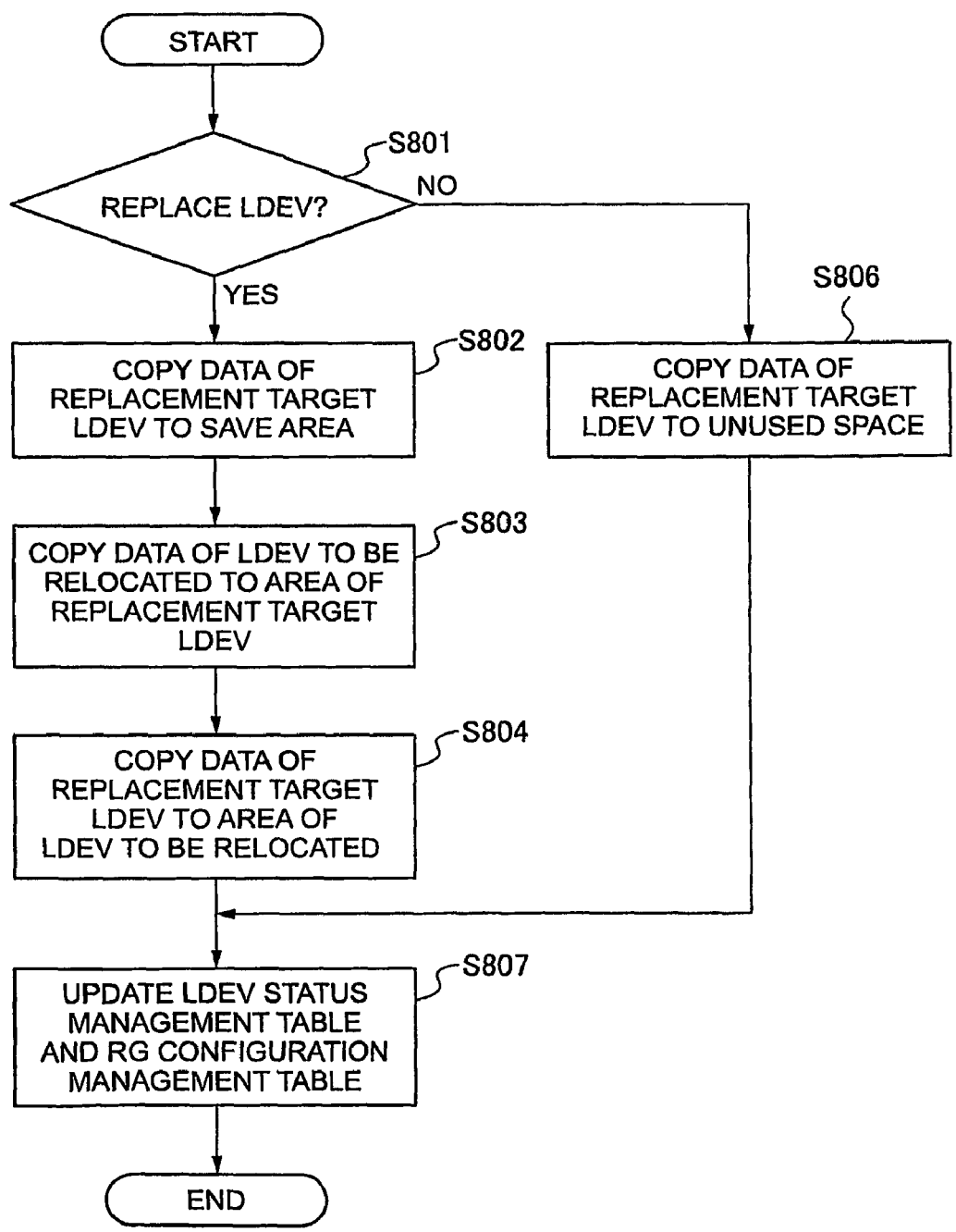
FIG. 19 is a flowchart to describe the processing of an LDEV relocation.

The processing for replacing and moving LDEVs is described with reference to the flowchart in FIG. 19. Firstly, the CPU 21 determines whether to replace or move LDEVs based on the "relocation type" flag information (S801) to be sustained in the local memory 22, and if LDEV replacement is selected, copies all the data in the area of the replacement target LDEV to the saving area (S802). Next, the CPU 21 copies and overwrites all the data in the area of the LDEV to be relocated to the area of the replacement target LDEV (S803). Then the CPU 21 copies and overwrites the replacement target LDEV data in the saving area to the area of the LDEV to be relocated (S804).

Meanwhile, in S801, if LDEV moving is selected, the CPU 21 copies and overwrites the data in the area of the LDEV to be relocated to unused space in the relocation destination RG (S806).

Finally, the CPU 21, updates the LDEV status management table T4 by replacing the number of the RG to which the LDEV to be relocated belongs, from the number of the relocation source RG to the number of the relocation destination RG, and further replacing the number of the RG to which the replacement target LDEV belongs, from the number of the relocation destination RG to the number of the relocation source RG if the relocation type is "replace". Furthermore, the CPU 21, updates the RG configuration management table T2 by replacing the LDEV ID of the relocation destination RG, from the number of replacement target LDEV to the number of the LDEV to be relocated, and by further replacing the LDEV ID of the relocation source RG, from the number of the LDEV to be relocated to the number of the replacement target LDEV if the relocation type is "replace" (S805), completes the processing of this routine.

Note that, if there is an access request from the host computer 80 to the relocation source RG or the relocation destination RG during the above-mentioned processing, it must be notified to the host computer 80 that it is busy and unable to accept any access.

According to this embodiment, as an LDEV with high spin up count is relocated to an RG with low wear-out rate, the wear-out rate of the cycle count among RGs in a storage system 10 is equalized.

Though this embodiment describes the LDEV relocation among HDDs, moving an LDEV to an RG configured of SSDs can also be selected. In that case, the method would be that a threshold for long access interval count that can be set by the management terminal 28, and an LDEV that exceeds the threshold is moved to an RG configured of SSDs. As a result, while sustaining or improving the performance, power saving can be realized and at the same time the increase of the cycle count in HDDs can be inhibited, and therefore, the reliability of storage systems 10 can be improved.

As mentioned above, if there is an upper limit value of a plurality of types of cycle counts in a whole storage system 10, among RGs, or in HDDs that configure an RG, the cycle counts can be deconcentrated among RGs, and in the RG if there are plurality of upper limit values of cycle counts in HDDs that configure an RG. As a result, even for the host access in which spin up and spin down of the RG that corresponds to the LDEVs that configure LUs is repeated frequently, the reliability of storage systems 10 can be improved.

Though the embodiment above describes the method of deconcentrating the cycle counts in an RG or among. RGs, the effect of improving the reliability of storage systems can be achieved even by the cycle count deconcentration control either only in an RG or only among RGs.

The invention claimed is:

1. A storage system, comprising:
a plurality of storages for storing data; and
a controller connected to a host computer via a network and which identifies access from the host computer, specifies a storage to be subject to the access among the plurality of storages, sends and receives data to and from the specified storage, and controls a plurality of operation modes of the plurality of storages;
wherein the controller controls the operation modes of either an idle operation mode which causes the storages to enter an idle status, or a plurality of power saving operation modes which cause the storages to enter a power saving status that saves more power than the idle operation mode;
wherein the plurality of power saving operation modes include a low-speed rotation operation mode for causing the storages to enter a rotation status that is slower than the idle operation mode, and a standby operation mode for causing the storages to enter a rotation stop status;
wherein the controller includes a local memory for storing respective upper limit values of a plurality of control cycle counts of the storages showing an execution count of a plurality of control cycles in which the idle operation mode and each of the power saving operation modes makes a circuit;
wherein the local memory stores as a plurality of upper limit values:
a first upper limit value, of the upper limit values, of a first power saving control cycle count showing an execution count of a first power saving control cycle in which the idle operation mode and the standby operation mode make a circuit; and
a second upper limit value, of the upper limit values, of a second power saving control cycle count showing an execution count of a second power saving control cycle in which the idle operation mode and either the low-speed rotation operation mode or the standby operation mode make a circuit; and
wherein, during the course of controlling the operation modes of the storages, the controller:
measures the first power saving control cycle count and the second power saving control cycle count, and calculates a first wear-out rate which is the ratio of a measured value of the first power saving control cycle count and the first upper limit value stored in the local memory, and a second wear-out rate which is the ratio of a measured value of the second power saving control cycle count and the second upper limit value stored in the local memory;

compares the first wear-out rate to the second wear-out rate; and for each of the storages in the idle operation mode:

selects the low-speed rotation operation mode if the first wear-out rate is greater than the second wear-out rate; and selects the standby operation mode if the first wear-out rate is less than the second wear-out rate.

2. The storage system according to claim 1, wherein the plurality of storages are divided into a plurality of RAID groups (RG), and the plurality of RAID groups (RG) have a plurality of logical devices (LDEV) as virtual logical areas configured therein;

wherein, during the course of controlling the operation mode of storages belonging to each of the RAID groups (RG), the controller measures the access interval to each of the logical devices (LDEV) belonging to each of the RAID groups (RG), and measures the frequency in which the measured access interval exceeds a prescribed setting time or the cumulative count in which the measured access interval exceeds the setting time, additionally measures the first wear-out and the second wear-out rates showing the ratio of the measured values of the respective first power saving and second power saving control cycle counts and the respective first and second upper limit values for each of the RAID groups (RG), sets the logical device (LDEV) with the maximum frequency or cumulative count as a relocation target logical device (LDEV), selects a RAID group (RG) in which the measured values of the respective first wear-out and the second wear-out rates are the smallest as a relocation destination RAID group among RAID groups (RG) other than the RAID group to which the relocation target logical device (LDEV) belongs, sets one of the logical devices (LDEV) belonging to the relocation destination RAID group as a replacement target logical device (LDEV), relocates the relocation target logical device (LDEV) to the relocation destination RAID group, and relocates the replacement target logical device (LDEV) to the RAID groups (RG) to which the relocation target logical device (LDEV) used to belong.

3. The storage system according to claim 1, wherein the plurality of storages are divided into a plurality of RAID groups (RG), and the plurality of RAID groups (RG) have a plurality of logical devices (LDEV) as virtual logical areas configured therein;

wherein, during the course of controlling the operation mode of storages belonging to each of the RAID groups (RG), the controller measures the access interval to each of the logical devices (LDEV) belonging to each of the RAID groups (RG), and measures the frequency in which the measured access interval exceeds a prescribed setting time or the cumulative count in which the measured access interval exceeds the setting time, additionally measures the first wear-out and the second wear-out rates showing the ratio of the measured values of the respective first power saving and second power saving control cycle counts and the respective first and second upper limit values for each of the RAID groups (RG), sets the logical device (LDEV) with the maximum frequency or cumulative count as a relocation target logical device (LDEV), selects a RAID group (RG) in which the measured values of the respective first wear-out and the second wear-out rates are the smallest as a relocation destination RAID group among RAID groups (RG) other than the RAID group to which the relocation target logical device (LDEV) belongs, and moves the relocation target logical device (LDEV) to an unused area of the relocation destination RAID group.

4. The storage system according to claim 1, wherein the plurality of storages are divided into a plurality of RAID groups wherein, during the course of controlling the operation mode of storages belonging to each of the RAID groups (RG), the controller measures respective first power saving and second power saving control cycle counts of each of the RAID groups (RG), calculates the incremental count of the measured values of the respective first power saving and second power saving control cycle counts as the frequency per day based on the measured values, estimates the life of each of the RAID groups (RG) from the time obtained by dividing the difference between the respective first and second upper limit values set for the respective first power saving and second power saving control cycle counts and the measured values of the respective first power saving and second power saving control cycles by the calculated frequency, and the current date, and displays the estimated result on a management screen of a management terminal via a network.

\* \* \* \* \*